US012558656B2

(12) United States Patent
Livingston et al.

(10) Patent No.: US 12,558,656 B2
(45) Date of Patent: Feb. 24, 2026

(54) MEMBRANES AND PREPARATION THEREOF

(71) Applicant: IMPERIAL COLLEGE INNOVATIONS LIMITED, London (GB)

(72) Inventors: Andrew Guy Livingston, London (GB); Zhiwei Jiang, London (GB); Ruijiao Dong, London (GB); Jia Xu, London (GB); Siyao Li, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 574 days.

(21) Appl. No.: 17/915,894

(22) PCT Filed: Mar. 29, 2021

(86) PCT No.: PCT/GB2021/050781
§ 371 (c)(1),
(2) Date: Sep. 29, 2022

(87) PCT Pub. No.: WO2021/205141
PCT Pub. Date: Oct. 14, 2021

(65) Prior Publication Data

US 2023/0140883 A1 May 11, 2023

(30) Foreign Application Priority Data

Apr. 7, 2020 (GB) .................................... 2005106

(51) Int. Cl.
*B01D 61/02* (2006.01)
*B01D 67/00* (2006.01)
*B01D 69/12* (2006.01)
*B01D 71/56* (2006.01)

(52) U.S. Cl.
CPC ....... *B01D 69/1251* (2022.08); *B01D 61/027* (2013.01); *B01D 67/0006* (2013.01); *B01D 71/56* (2013.01); *B01D 2323/30* (2013.01); *B01D 2323/40* (2013.01)

(58) Field of Classification Search
CPC ............ B01D 67/0006; B01D 69/1251; B01D 71/56; B01D 2325/30
See application file for complete search history.

(56) References Cited

U.S. PATENT DOCUMENTS

| | | | |
|---|---|---|---|
| 4,612,118 | A | 9/1986 | Kamiyama et al. |
| 5,338,455 | A | 8/1994 | Koenhen et al. |
| 5,693,227 | A | 12/1997 | Costa |
| 5,833,854 | A | 11/1998 | Zwijnenburg et al. |
| 2017/0157567 | A1 | 6/2017 | Livingston et al. |

FOREIGN PATENT DOCUMENTS

| | | | |
|---|---|---|---|
| CN | 108997179 | A | 12/2018 |
| JP | S62-163702 | A | 7/1987 |
| WO | 2010/042250 | A2 | 4/2010 |
| WO | 2010/096563 | A1 | 8/2010 |

OTHER PUBLICATIONS

Qi et al., Polymersomes-based high-performance reverse osmosis membrane for desalination. Journal of Membrane Science. 2018;555:177-184.
Seo et al., Interfacial Polymerization of Reactive Block Polymers for the Preparation of Composite Ultrafiltration Membranes. Ind Eng Chem Res. 2014;53:18575-18579.
La et al., Enhanced desalination performance of polyamide bi-layer membranes prepared by sequential interfacial polymerization. J. Membrane Sci. Jun. 15, 2013;437:33-39.
Petersen, Composite reverse osmosis and nanofiltration membranes. J. Membrane Sci. Aug. 12, 1993;83(1):81-150.
Zuo et al., Design and synthesis of a fluoro-silane amine monomer for novel thin film composite membranes to dehydrate ethanol via pervaporation. J. Mater. Chem. A. Aug. 2013;1(34):9814-26.
Zydowicz et al., Formation of aqueous core polyamide microcapsules obtained via interfacial polycondensation: Optimization of the membrane formation through pH control. J. Mem. Sci. 2001;189(1):41-58.
International Search Report and Written Opinion for Application No. PCT/GB2021/050781, dated Jun. 4, 2021, 10 pages.
Combined Search and Examination Report for Application No. GB2005106.6, dated Oct. 21, 2020, 7 pages.

*Primary Examiner* — Bradley R Spies
(74) *Attorney, Agent, or Firm* — McCarter & English, LLP; Steven G. Davis; Wei Song

(57) ABSTRACT

Novel membranes suitable for use in separation applications are described, as well as processes by which the membranes are made and uses of the membranes in a range of separation applications. The membranes are obtainable by an interfacial polymerisation reaction involving two monomers, in which at least one of the monomers comprises oligomeric portions that are suitable for tuning the separation characteristics of the membrane, particularly in liquid separations, such as organic solvent nanofiltration.

17 Claims, 21 Drawing Sheets

MEMBRANES AND PREPARATION THEREOF

CROSS-REFERENCE TO RELATED APPLICATIONS

This application is a U.S. national stage filing, under 35 U.S.C. § 371 (c), of International Application No. PCT/GB2021/050781, filed on Mar. 29, 2021, which claims the priority of United Kingdom Patent Application No. 2005106.6, filed on Apr. 7, 2020.

The present invention relates to membranes suitable for use in separation applications, as well as to processes by which the membranes are made and uses of the membranes in a range of separation applications. More specifically, the present invention relates to membranes obtained by an interfacial polymerisation reaction involving two monomers, in which at least one of the monomers comprises oligomeric portions that are suitable for tuning the separation characteristics of the membrane, particularly in liquid separations, such as organic solvent nanofiltration.

BACKGROUND OF THE INVENTION

Membrane technology is widely employed in separation processes for selectively sieving substances with a range of molecular weights in liquid or gas phases (see for example "Membrane Technology and Applications" $2^{nd}$ Edition, R. W. Baker, John Wiley and Sons Ltd, ISBN 0-470-85445-6).

In particular, applications including nanofiltration and reverse osmosis have gained attention based on the relatively low operating pressures, high fluxes and low operation and maintenance costs associated therewith. Nanofiltration is a pressure-driven process utilising membranes in liquid phase for the separation of substances with molecular weight in the range of 200-2,000 $g \cdot mol^{-1}$. Reverse osmosis separates salts with molecular weight less than 200 g $mol^{-1}$ from water. Molecular weight cut-off (MWCO) is used to demonstrate the selectivity performance of a membrane, which is generally defined as the molecular weight of a molecule that would exhibit a rejection of 90% when subjected to nanofiltration by the membrane.

Membranes for reverse osmosis, nanofiltration, pervaporation and gas separation are generally fabricated as composite membranes. Thin film composite (TFC) membranes may be fabricated via interfacial polymerization (herein also referred to as IP). Conventionally, an aqueous solution containing amines or alcohols and an organic solution containing acyl chlorides react at an interface to form polyamide or polyester films as the separating layer in TFC membranes.

The IP technique is well known to those skilled in the art [Petersen, R. J. "*Composite reverse osmosis and nanofiltration membranes*". J. Membr. Sci, 83, 81-150, 1993], and has been used to fabricate TFC membranes for reverse osmosis. Most usually in the IP technique, an aqueous solution of a first reactive monomer (often a polyamine) is first deposited within the porous structure of a support membrane, often a polysulfone ultrafiltration membrane. Then, the polysulfone support membrane loaded with the reactive monomer solution is immersed in a water-immiscible solvent solution containing a second reactive monomer, such as triacyl chloride in hexane or other alkane. The first and second reactive monomers react at the interface of the two immiscible solutions, until a thin film presents a diffusion barrier and the reaction is completed to form a highly cross-linked thin film layer that remains adhered to the support membrane. The thin film layer can be from several nanometres to several micrometres thick.

A variety of techniques have been proposed for modifying the properties of thin film composite membranes prepared by interfacial polymerisaton, in particular membrane flux.

For example, the inclusion of additives in the monomer solutions brought together during interfacial polymerisaton has been explored as a possible means of altering the permeance of the resulting membrane. U.S. Pat. No. 4,950,404, describes a method for increasing flux of a TFC membrane by adding a polar aprotic solvent and an optional acid acceptor to the aqueous amine solution prior to the interfacial polymerisation reaction.

Capping treatments have also been employed to functionalize the membrane surface and alter the surface chemistry for improving water permeance. After fabricating a polyamide separating layer from piperazine and trimesoyl chloride, triethanolamine was added to cap residual acyl chloride and produce a hydroxyl enriched surface [Yan, F., H. Chen, Y. Lu, Z. H. Lu, S. C. Yu, M. H. Liu and C. J. Gao. "*Improving the water permeability and antifouling property of thin-film composite polyamide nanofiltration membrane by modifying the active layer with triethanolamine*", Journal of Membrane Science 513: 108-116, 2016]. U.S. Pat. No. 10,434,479B2 describes TFC membranes comprising polyester separating layer possessing intrinsic microporosity, which enhance the connectivity of crosslinked polymer network and increase the solvent permeances. In addition, a capping treatment has been described to functionalize the membrane surface with fluorinated groups and improve the performance of non-polar solvents (Jimenez-Solomon M and Livingston A G, "High Flux Hydrophobic Membranes for Organic Solvent Nanofiltration (OSN)—Interfacial Polymerization, Surface Modification and Solvent Activation", *J. Mem.Sci* 434 (2013) pp. 193-203).

Elsewhere, post-processing techniques have been employed. For example, it has been claimed that soaking freshly prepared TFC membranes in solutions containing various organic species, including glycerol, sodium lauryl sulfate, and the salt of triethylamine with camphorsulfonic acid can increase the water flux in RO applications by 30-70% [M. A. Kuehne, R. Q. Song, N. N. Li, R. J. Petersen, "*Flux enhancement in TFC RO membranes*", *Environ. Prog.* 20 (1), 23, 2001]. As described in U.S. Pat. Nos. 5,234,598 and 5,358,745, TFC membrane physical properties (abrasion resistance), and flux stability can also be improved by applying an aqueous solution composed of poly(vinyl alcohol) (PVA) and a buffer solution as a post formation step during membrane preparation. Adding alcohols, ethers, sulfur-containing compounds, monohydric aromatic compounds and more specifically dimethyl sulfoxide (DMSO) in the aqueous phase can produce TFC membranes with an excellent performance [S.-Y. Kwak, S. G. Jung, S. H. Kim, "*Structure-motion-performance relationship of flux-enhanced reverse osmosis (RO) membranes composed of aromatic polyamide thin films*", Environ. Sci. Technol. 35, 4334, 2001; U.S. Pat. Nos. 5,576,057; 5,614,099]. After addition of DMSO to the interfacial polymerization system, TFC membranes with water flux five times greater than the normal TFC water flux with a small loss in rejection were obtained [S. H. Kim, S.-Y. Kwak, T. Suzuki, "*Positron annihilation spectroscopic evidence to demonstrate the flux-enhancement mechanism in morphology-controlled thin-film-composite (TFC) membrane*", Environ. Sci. Technol. 39, 1764, 2005].

Nevertheless, not only do the techniques described above have narrow applicability, they have demonstrated limited improvement in the ability of TFC membranes prepared by interfacial polymerisation to process certain solvents, including non-polar solvents specifically. For example, although TFC membranes comprising a thin film synthesized from piperazine/m-phenylenediamine and trimesoyl chloride on a PAN support membrane performed well in methanol, ethanol and acetone, they performed notably less well in i-propanol and MEK, and gave no flux whatsoever in hexane [Kim, I.-C., Jegal, J. & Lee, K.-H. "*Effect of aqueous and organic solutions on the performance of polyamide thin-film-composite nanofiltration membranes*." Journal of Polymer Science Part B: Polymer Physics 40, 2151-2163, 2002].

There is therefore a need for new, broadly applicable membrane fabrication techniques through which the properties of the resulting membrane, especially its flux in target solvents, can be facilely tuned. There is a particular need for techniques suitable for preparing nanofiltration membranes having improved flux in non-polar solvents, notably hexane and heptane.

The present invention was devised with the foregoing in mind.

SUMMARY OF THE INVENTION

According to a first aspect of the present invention there is provided an interfacial polymerisation process for the preparation of a thin film membrane, the process comprising the step of reacting a first monomer and a second monomer at the interface of two immiscible liquids to produce a crosslinked polymeric film;

wherein the crosslinked polymeric film is composed of at least one crosslinked polymer; and at least one of the first monomer and second monomer is a compound of formula (I) shown below:

$$T—Q—L—Y—L—Q—T \quad (I)$$

in which each Q is a chemically-inert oligomer having a predetermined number of repeating units, m;

Y is a reactive moiety comprising at least 2 groups capable of reacting with the other of the first monomer and second monomer to produce the crosslinked polymeric film;

each L is a linking moiety through which each Q is covalently bonded to Y; and each T is a chemically-inert terminating group.

Suitably, the crosslinked polymeric film is formed on the surface of a supporting membrane. Alternatively, the crosslinked polymeric film, once formed, is transferred onto a supporting membrane. In both scenarios, the resulting assembly is a thin film composite membrane. The supporting membrane is suitably a polymeric material, such as polyacrylonitrile.

According to a second aspect of the present invention there is provided a thin film membrane obtainable, obtained or directly obtained by the process according to the first aspect.

According to a third aspect of the present invention there is provided a thin film membrane, the thin film membrane comprising/consisting essentially of/consisting of a plurality of interconnected moieties, each of formula (Ia), linked to one another to provide a crosslinked polymer:

$$T—Q—L—Y_a—L—Q—T \quad (Ia)$$

in which each Q is a chemically-inert oligomer having a predetermined number of repeating units, m;

each L is a linking moiety through which each Q is covalently bonded to $Y_a$;

each T is a chemically-inert terminating group; and $Y_a$ is a group comprising at least two crosslinking moieties $Z_a$, wherein each crosslinking moiety $Z_a$ links one moiety of formula (Ia) to another moiety of formula (Ia).

According to a fourth aspect of the present invention there is provided a use of a thin film membrane according to the second or third aspect in a process for isolating one or more components from a mixture.

According to a fifth aspect of the present invention there is provided a process for isolating one or more compounds from a mixture, the process comprising the step of contacting the mixture with the thin film membrane according to the second or third aspect.

In the fourth and fifth aspects, the process for isolating one or more components from a mixture is suitably a process selected from the list consisting of gas separation, pervaporation, reverse osmosis, nanofiltration, desalination and water treatment. More suitably, the process is nanofiltration. Even more suitably, the process is nanofiltration and the mixture comprises one or more non-polar solvents (e.g. hydrocarbon solvents, such as hexane or heptane) and dissolved solutes.

DETAILED DESCRIPTION OF THE INVENTION

Interfacial Polymerisation Process

In a first aspect, the present invention provides an interfacial polymerisation process for the preparation of a thin film membrane, the process comprising the step of reacting a first monomer and a second monomer at the interface of two immiscible liquids to produce a crosslinked polymeric film;

wherein the crosslinked polymeric film is composed of at least one crosslinked polymer; and at least one of the first monomer and second monomer is a compound of formula (I) shown below:

$$T—Q—L—Y—L—Q—T \quad (I)$$

in which each Q is a chemically-inert oligomer having a predetermined number of repeating units, m;

Y is a reactive moiety comprising at least 2 groups capable of reacting with the other of the first monomer and second monomer to produce the crosslinked polymeric film;

each L is a linking moiety through which each Q is covalently bonded to Y; and each T is a chemically-inert terminating group.

Through rigorous investigation, the inventors have developed a flexible and widely applicable approach for modifying conventional interfacial polymerisation techniques, through which the properties of the resulting thin film membrane, in particular its flux in a variety of solvents, can be straightforwardly tuned. The approach developed by the inventors involves replacing at least one (e.g. one or both) of the monomers conventionally used in interfacial polymerisation with a compound of formula (I). The compound of formula (I) (also referred to herein as a MOM—multioligomer monomer) includes a reactive moiety Y capable of participating in an interfacial polymerisation reaction, which is connected (by linking groups L) to chemically-inert oligomers Q, each one terminating in a group T. The properties of the resulting thin film membrane can be conveniently controlled by changing the nature of the oligomers Q, which can be straightforwardly prepared by conventional synthetic techniques. For example, employing hydrophobic oligomers Q increases the hydrophobicity of the resulting thin film membrane, thereby making it more apt at separating non-polar liquids (e.g. hydrocarbon solvents, such as hexane or heptane). Alternatively, oligomers Q containing charged groups or other functional groups can be selected to confer specific functionality to the resulting thin film membrane. The length of the oligomers Q—in terms of the number of repeating units contained therein—can be varied in order to fine-tune the target property (e.g. degree of hydrophobicity) of the resulting thin film membrane.

As used herein, the term crosslinked polymer will be understood to mean a network polymer. Network polymers, in particular those prepared by interfacial polymerisation, will be familiar to one of ordinary skill in the art. In particular, those of ordinary skill in the art will appreciate that network polymers are formed upon reaction of a first monomer having a functionality of at least 2 with a second monomer having a functionality of at least 2. For illustrative purposes only, one example of a network polymer is that resulting from the interfacial polymerisation of m-phenylene diamine and trimesoyl chloride.

The crosslinked polymeric film may be composed of one or more crosslinked polymers selected from the group consisting of polyamide, polyester, aromatic polyhydrazide, sulfonated polyfurane, polypiperazine isophthalamde, polyepiamine-amide, polyepiamine-urea, polyethyleneimine-urea, polyether-amide, polyether-urea and polyester-amide. Depending on the nature of the first and second monomers (at least one of which is a compound of formula (I)), the resulting polymer may be recognisable as more than one of the aforementioned polymers. For example, if Y comprises both amine and hydroxy groups, reaction of this particular compound of formula (I) with, for example, a polyacylhalide will result in a crosslinked polymer having a plurality of amide and ester crosslinking groups, such that the polymer may be viewed as both a polyamide and a polyester. Moreover, the first and second monomers may (or may not) be accompanied by one or more additional monomers. For example, the second monomer (having, e.g., an amine functionality) may be accompanied by a third monomer (having, e.g., hydroxy functionality), such that reaction of the first monomer (e.g. a compound of formula (I) in which Y comprises acyl halide functionality) with the second and third monomers results in the formation of a crosslinked polymeric film composed of two different crosslinked polymers (e.g. a crosslinked polyamide and a crosslinked polyester).

In an embodiment, the crosslinked polymeric film is composed of at least one crosslinked polymer selected from the group consisting of polyamide, polyester and polyether. Suitably, the crosslinked polymeric film is composed of at least one crosslinked polymer selected from the group consisting of polyamide and polyester.

In a particular embodiment, the crosslinked polymeric film is composed of a crosslinked polyamide. In such an embodiment, the first monomer (or the second monomer) is suitably a polyamine and the second monomer (or the first monomer) is suitably a polyacylhalide.

In a particular embodiment, the crosslinked polymeric film is composed of a crosslinked polyester. In such an embodiment, the first monomer (or the second monomer) is suitably a polyhydroxy compound and the second monomer (or the first monomer) is suitably a polyacylhalide.

Each Q is a chemically-inert oligomer having a predetermined number of repeating units, m. As used throughout this specification in relation to a variety of groups, the term chemically-inert means that the group in question is unreactive in, and therefore does not participate in, the interfacial polymerisation reaction. Consequently, chemically-inert groups have the same chemical structure before and after the interfacial polymerisation reaction has occurred. As used herein, the term predetermined number of repeating units, m means that the exact number of repeating units, m is known.

In an embodiment, m is 2 to 20. Suitably, m is 2 to 15. More suitably, m is 2 to 10. Even more suitably, m is 2 to 8. Most suitably, m is 2 to 6.

In an embodiment, m is 3 to 20. Suitably, m is 3 to 15. More suitably, m is 3 to 10. Even more suitably, m is 3 to 8. Most suitably, m is 3 to 6.

In an embodiment, Q is selected from the group consisting of:

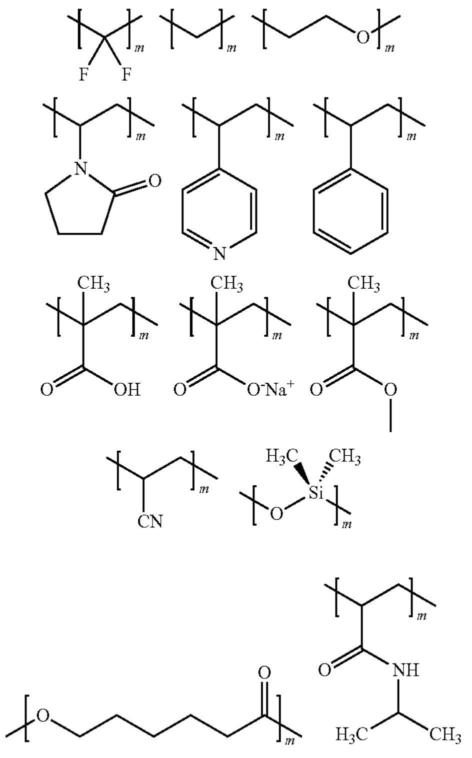

-continued

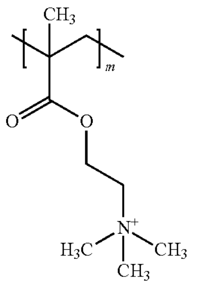

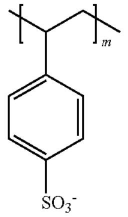

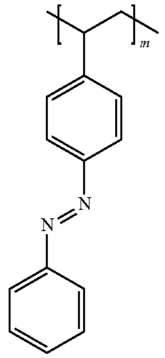

in which m is as defined hereinbefore.

The compound of formula (I) may have a hydrophilic-lipophilic balance (HLB) of >10. When the compound of formula (I) is hydrophilic, the resulting thin film membrane may be better suited to particular applications, such as liquid separations wherein the mixture to be separated is water or water-based.

Q groups that increase the hydrophilicity of the thin film membrane are selected from the group consisting of:

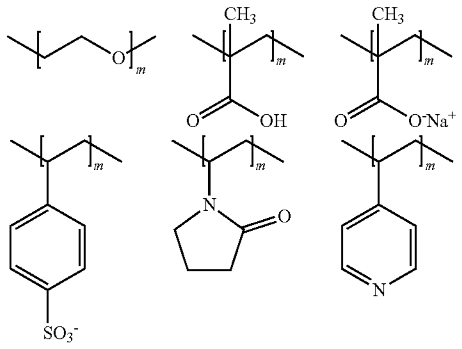

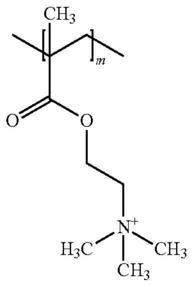

in which m is as defined hereinbefore.

The compound of formula (I) may have a hydrophilic-lipophilic balance (HLB) of <10. When the compound of formula (I) is hydrophobic, the resulting thin film membrane may be better suited to particular applications, such as liquid separations wherein the mixture to be separated contains one or more non-polar solvents (e.g. hydrocarbon solvents, such as toluene, hexane or heptane). Suitably, the compound of formula (I) may have a hydrophilic-lipophilic balance (HLB) of ≤6.

Q groups that increase the hydrophobicity of the thin film membrane are selected from the group consisting of:

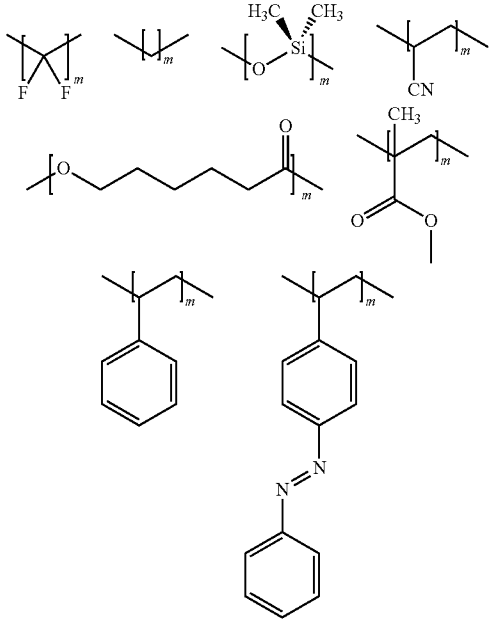

in which m is as defined hereinbefore.

Each T is a chemically-inert terminating group that caps the unbound terminal of Q. Any suitable chemically inert terminating group may be used depending on the nature of Q. Indeed, it will be understood that the nature of each T will depend on the nature of Q, such that only those terminating groups T that are chemically feasible for a given group (or groups) Q would be considered. The simplest form of terminating group T is a single atom, although larger terminating groups are also envisaged. Exemplary terminating groups T include —H, —F, —$CH_3$, —$OCH_3$, —$OCH_2C_6H_5$, —CH═$CH_2$, PmbS (4-methoxybenzyl thioether), —C≡CH, —OTs, —$N_3^+$, —SH, —COOH and —$SO_3^-$. Suitably, both terminating groups T are the same.

Each L is a linking moiety through which each Q is covalently bonded to Y. Suitably, each L is chemically-inert. Each L may be any group capable of linking each Q to Y. Indeed the nature of each L will depend on the nature of Q and Y. In its simplest form, each L is a bond. Suitably, each L contains fewer than 20 backbone atoms (i.e. disregarding the atoms of any side chains). More suitably, each L contains fewer than 10 backbone atoms. Suitably, both linking moieties L are the same.

In a particular embodiment, each L is an amido linkage.

Each Y is a reactive moiety comprising at least 2 groups capable of reacting with the other of the first monomer and second monomer to produce the crosslinked polymeric film. In an embodiment, Y comprises up to 10 reactive groups. More suitably, Y comprises up to 8 reactive groups. Most suitably, Y comprises up to 6 reactive groups In a particular embodiment, Y comprises at least 3 reactive groups. For example, Y may comprise 3 reactive groups or 4 reactive groups or 5 reactive groups. Suitably, Y comprises 3 reactive groups.

Y may comprise any reactive groups capable of reacting with the other of the first monomer and second monomer to produce the target crosslinked polymer. It will therefore be understood that the reactive groups present in Y and those reactive groups present in the other of the first monomer and second monomer must be chemically complementary.

In an embodiment, the reactive groups present in Y are each independently selected from the group consisting of $—NH_2$, —NH—, —OH, —C(═O)X (wherein X is halo) and —C(═O)NH—$NH_2$. Suitably, the first monomer is a compound of formula (I) in which the reactive groups present in Y are each independently selected from the group consisting of $—NH_2$, —NH—, —OH, —C(═O)X (wherein X is halo) and —C(═O)NH—$NH_2$, the second monomer (which may also be a compound of formula (I)) comprises reactive groups that are able to react with the reactive groups of the first monomer to produce the crosslinked polymer, wherein the crosslinked polymer is selected from the group consisting of polyamide, polyester, aromatic polyhydrazide, sulfonated polyfurane, polypiperazine isophthalamde, polyepiamine-amide, polyepiamine-urea, polyethyleneimine-urea, polyether-amide, polyether-urea and polyester-amide Suitably, the reactive groups present in Y are each independently selected from the group consisting of $—NH_2$, —NH—, —OH and —C(═O)X, wherein X is halo.

The reactive groups present in Y may be the same or different. Suitably, all of the reactive groups present in Y are the same.

In a particular embodiment, Y is oligomeric having n number of repeating units, and wherein each repeating unit n comprises one of the reactive groups. In such embodiments, n may be 2 or 3, and is suitably less than 10. When Y is oligomeric, it may have the following structure:

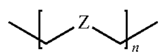

wherein n is 2-10 (e.g. 3 or 4 or 5); and each Z is independently selected from the group consisting of:

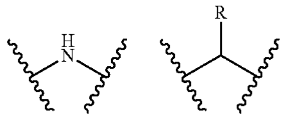

where R is selected from the group consisting of $—(CH_2)_vOH$, $—(CH_2)_vNH_2$, $—(CH_2)_vC(═O)X$ and $—(CH_2)_vC(═O)NHNH_2$, in which v is 0-4 and X is halo.

In a particular embodiment, the compound of formula (I) has any of the following structures:

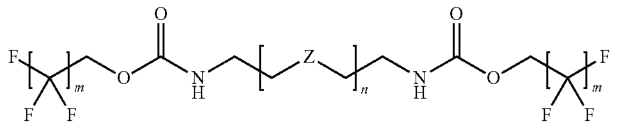

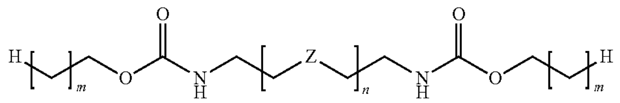

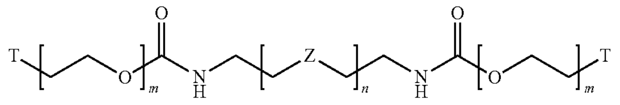

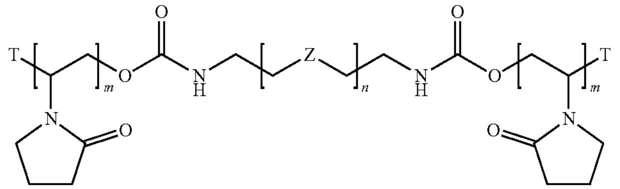

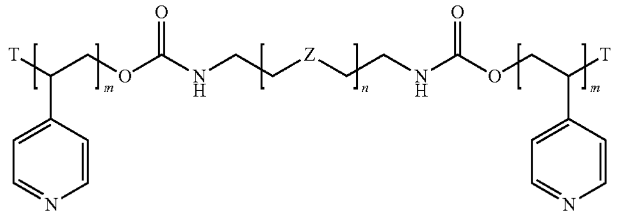

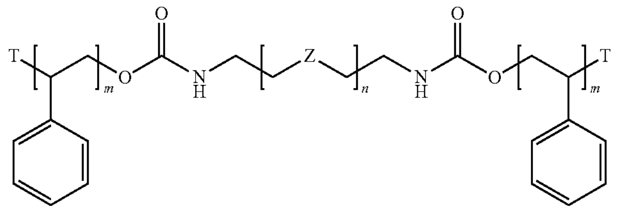

-continued
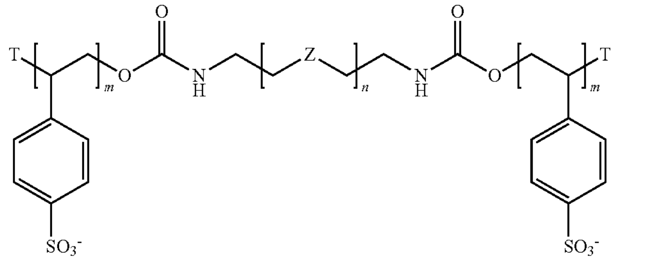
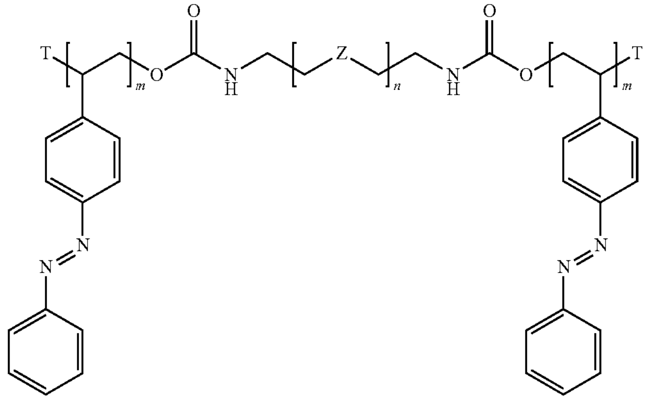
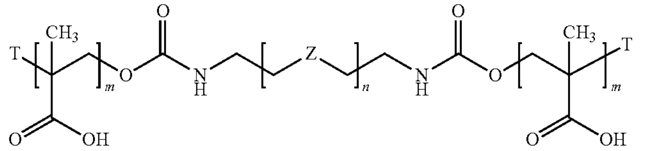
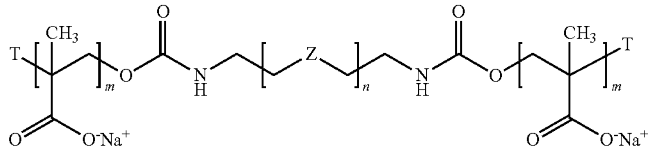
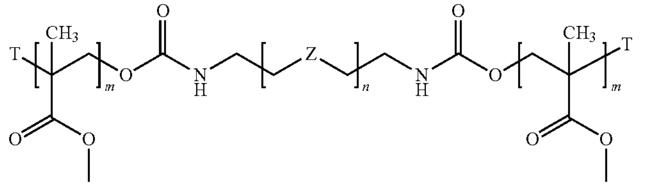
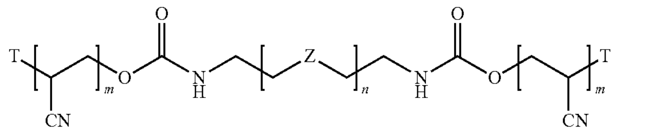
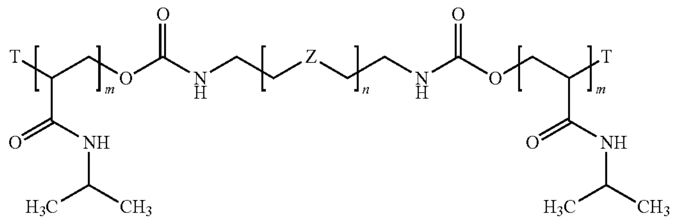

-continued

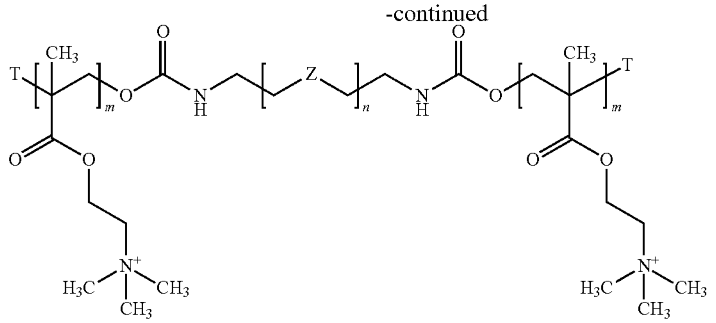

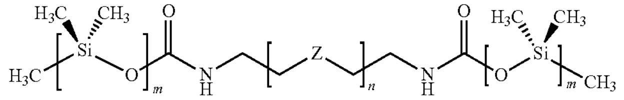

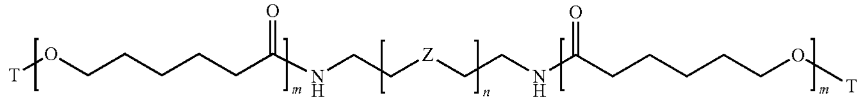

in which T, Z, m and n are independently as defined hereinbefore.

Suitably, the compound of formula (I) has either of the following structures:

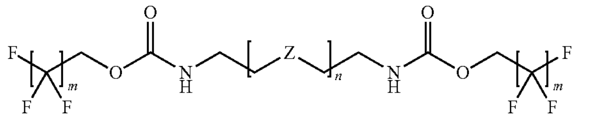

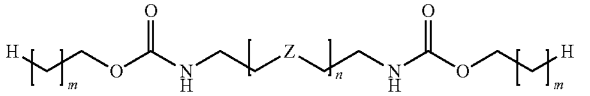

in which Z, m and n are independently as defined hereinbefore. Suitably, m is 2-6, n is 3-5, and each Z is independently selected from the group consisting of:

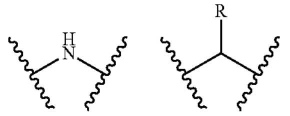

where R is selected from the group consisting of $—(CH_2)_vOH$, $—(CH_2)_vNH_2$, $—(CH_2)_vC(═O)X$ and $—(CH_2)_vC(═O)NHNH_2$, in which v is 0-4 and X is halo.

In a particular embodiment, the first monomer is a compound of formula (I) in which Y comprises $—NH_2$ reactive groups, and the second monomer is a polyacylhalide, such that the crosslinked polymer is a polyamide.

In a particular embodiment, the first monomer is a compound of formula (I) in which Y comprises —OH reactive groups, and the second monomer is a polyacylhalide, such that the crosslinked polymer is a polyester.

In a particular embodiment, the first monomer is a compound of formula (I) in which Y comprises $—C(═O)NH—NH_2$ reactive groups, and the second monomer is an aromatic polyacylhalide, such that the crosslinked polymer is an aromatic polyhydrazide.

In a particular embodiment, the first monomer is a compound of formula (I) in which Y comprises —C(═O)X (wherein X is halo) reactive groups, and the second monomer is

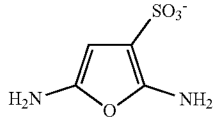

such that the crosslinked polymer is a sulfonated polyfurane.

In a particular embodiment, the first monomer is a compound of formula (I) in which Y comprises —C(═O)X (wherein X is halo) reactive groups, and the second monomer is piperazine, such that the crosslinked polymer is a polypiperazine isophthalamide.

In a particular embodiment, the first monomer is a compound of formula (I) in which Y comprises $—CH_2NH_2$ reactive groups, and the second monomer is a polyacylhalide, such that the crosslinked polymer is a polyepiamine-amide.

In a particular embodiment, the first monomer is a compound of formula (I) in which Y comprises $—CH_2NH_2$ reactive groups, and the second monomer is phenylene diisocyanate, such that the crosslinked polymer is a polyepiamine-urea.

In a particular embodiment, the first monomer is a compound of formula (I) in which Y comprises —NH— reactive groups, and the second monomer is phenylene diisocyanate, such that the crosslinked polymer is a polyethyleneimine-urea.

In a particular embodiment, the first monomer is a compound of formula (I) in which Y comprises —C(═O)X (wherein X is halo), and the second monomer is:

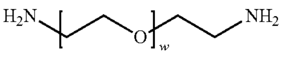

in which w is 1-4, such that the crosslinked polymer is a polyethyleneimine-urea.

In a particular embodiment, the first monomer is a compound of formula (I) in which Y comprises —$NH_2$ reactive groups, and the second monomer is:

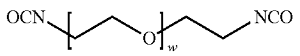

in which w is 1-4, such that the crosslinked polymer is a polyether-urea.

In a particular embodiment, the first monomer is a compound of formula (I) in which Y comprises —C(═O)X (wherein X is halo), and the second monomer is:

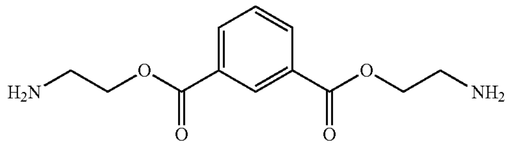 [SMILES: NCCOC(=O)c1cccc(C(=O)OCCN)c1]

such that the crosslinked polymer is a polyester-amide.

Non-limiting examples of the types of crosslinked polymers that can be prepared according to the interfacial polymerisation process are outlined in FIG. 13. In an embodiment, the first and second monomers have any of those structures appearing in FIG. 13.

In a particular embodiment, only the first monomer is a compound of formula (I). Suitably, the second monomer is a polyacylhalide (such as an aromatic polyacylhalide), a polyamine (such as an aromatic polyamine) or a polyhydroxy compound (such as an aromatic polyhydroxy compound). Suitably, the first monomer is a compound of formula (I) in which Y comprises 3-6 reactive groups selected from the group consisting of —$NH_2$, —NH—, and —OH, and the second monomer is a polyacylhalide. More suitably, the first monomer is a compound of formula (I) in which Y comprises 3-6 reactive groups selected from the group consisting of —$NH_2$ and —NH—, and the second monomer is a polyacylhalide. Even more suitably, the polyacylhalide is trimesoylchloride, isophthaloyl chloride or sebacoyl chloride.

In a particular embodiment, the first monomer and the second monomer are independently compounds of formula (I). Q, L and T in the first monomer may be the same as, or different to, Q, L and T in the second monomer. Suitably, in the first monomer, Y comprises 3-6 reactive groups selected from the group consisting of —$NH_2$, —NH—, and —OH; and in the second monomer, Y comprises 3-6 reactive groups being —C(═O)X, wherein X is halo. More suitably, in the first monomer, Y comprises 3-6 reactive groups selected from the group consisting of —$NH_2$ and —NH—; and in the second monomer, Y comprises 3-6 reactive groups being —C(═O)X, wherein X is halo.

In a particular embodiment, the first monomer is a compound of formula (I) in which Y comprises 3-6 reactive groups being —C(═O)X in which X is halo (i.e. acyl halide), and the second monomer is a polyamine (e.g. an aromatic diamine or triamine, such m-phenyl diamine) or a polyhydroxy compound.

In a particular embodiment, the first monomer is a compound of formula (I) having the following structure:

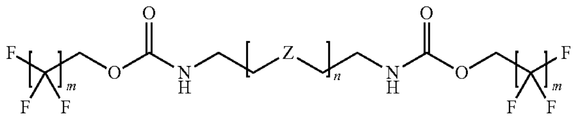

in which Z is —CH($NH_2$)—, —NH—, or —CH(OH)—, m is 2-6, and n is 3-5; and the second monomer is a polyacylhalide (e.g. trimesoylchloride, isophthaloyl chloride or sebacoyl chloride).

In a particular embodiment, the first monomer is a compound of formula (I) having the following structure:

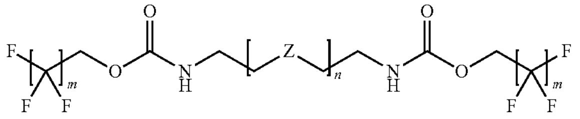

in which Z is —CH(R)—, where R is a group —C(═O)Cl; m is 2-6, and n is 3-5; and the second monomer is a polyamine (such as an aromatic polyamine, e.g. m-phenylene diamine) or a polyhydroxy compound (such as an aromatic polyhydroxy compound).

In an embodiment, the step of reacting a first monomer and a second monomer at the interface of two immiscible liquids to produce a crosslinked polymeric film comprises the steps of:

(a) providing a first solution comprising:

(i) a first solvent, and (ii) the first monomer;

(b) contacting the first solution with a second solution, the second solution comprising:

(i) a second solvent, the second solvent being immiscible in the first solvent, and (ii) the second monomer;

wherein reaction of the first monomer with the second monomer in step (b) results in the formation of the crosslinked polymeric film at the interface of the first solvent and the second solvent.

In an embodiment, the first solvent is water. The first monomer (which may or may not be a compound of formula (I)) is suitably one that comprises reactive groups selected from —$NH_2$, —NH—, and —OH. It will be understood that the first monomer (or at least a substantial portion of it) is in solution in the first solution. Therefore, depending on the nature of the first monomer, the first solvent may comprise up to 30 wt % of a solubility enhancer (e.g. THF or DMSO). The use of a solubility enhancer is particularly useful when the first monomer is hydrophobic. Alternatively, the first solvent may be THF, DMSO or a mixture thereof, optionally comprising up to 30 wt % water.

Where the first solvent is water, the second solvent is suitably at least one organic solvent. Where the second solvent is at least one organic solvent, the second monomer (which may or may not be a compound of formula (I)) is suitably one that comprises reactive groups being —C(═O)X, wherein X is halo. It will be understood that the second monomer (or at least a substantial portion of it) is in solution in the second solution. The second solvent is suitably one or more selected from the list consisting of hexane, heptane, toluene and xylene.

In an embodiment, the first solution comprises 0.005-30.0 wt. % of the first monomer. Suitably, the first solution comprises 0.01-15.0 wt. % of the first monomer. More suitably, the first solution comprises 0.02-5.0 wt. % of the first monomer.

In an embodiment, the second solution comprises 0.005-30.0 wt. % of the second monomer. Suitably, the second solution comprises 0.01-15.0 wt. % of the second monomer. More suitably, the second solution comprises 0.02-5.0 wt. % of the second monomer.

In step (b), the crosslinked polymeric film may be formed on a porous supporting membrane. For example, step (b) may comprise contacting the first monomer with the second monomer, wherein one of those monomers is provided in the pores of the supporting membrane. Alternatively, in step (b), the crosslinked polymeric film may be formed at the free interface between the first solvent and second solvent during step (b) and is subsequently transferred onto a supporting membrane. In such embodiments, the resulting assembly is a thin film composite membrane. As will be familiar to one of ordinary skill in the art, the supporting membrane confers mechanical support to the crosslinked polymeric film.

The supporting membrane may be polymeric. For example, the polymeric supporting membrane may be composed of one or more polymers selected from the group consisting of polysulfone, polyethersulfone, poly(ether sulfone ketone), polyacrylonitrile, polypropylene, polyamide, cellulose acetate, cellulose diacetate, cellulose triacetate, poly(ether ethyl ketone), poly(pthalazinone ether sulfone ketone), a perfluoropolymer, polyimide, polybenzimidazole, sulfonated polyether ether ketone and crosslinked versions thereof. Suitably, polymeric supporting membrane is composed of polyacrylonitrile. The polymeric supporting membrane may itself be provided on a backing material (e.g. a non-woven material, such as non-woven polyethylene terephthalate).

Alternatively, the supporting membrane may be composed of one or more material selected from the group consisting of silicon carbide, silicon oxide, zirconium oxide, titanium oxide, aluminium oxide and zeolite.

The process may further comprise a further step (c), in which the crosslinked polymeric film resulting from step (b) (which may be provided on a supporting membrane) is isolated and dried. Drying will be understood to mean removing at least some of the residual solvent present in or on the thin film membrane after it is isolated. The extent to which the isolated membrane is dried will depend on the intended use of the thin film membrane, as well as the need for any post-processing techniques, such as those discussed below.

In an embodiment, the isolated and dried crosslinked polymeric film (which may be provided on a supporting membrane) is contacted with a conditioning agent. Suitably, the step of contacting (e.g. soaking or rinsing) the crosslinked polymeric film with the conditioning agent is performed when the crosslinked polymeric film is not completely dry (i.e. it still contains some solvent). Those of ordinary skill in the art will understand that the term conditioning agent refers to a liquid capable of maintaining the structure of the thin film membrane (including preventing pore collapse) when the thin film membrane is in a dry state. Suitably, the conditioning agent is a low volatility organic liquid (i.e. an organic liquid having a boiling point greater than 150° C. at ambient pressure). Suitably conditioning agents include synthetic oils (e.g., polyolefinic oils, silicone oils, polyalphaolefinic oils, polyisobutylene oils, synthetic wax isomerate oils, ester oils and alkyl aromatic oils), mineral oils (e.g. solvent refined oils, hydroprocessed mineral oils and petroleum wax isomerate oils), vegetable fats and oils, higher alcohols (e.g. alcohols having more than 10 carbon atoms, such as decanol, dodecanol and heptadecanol), glycerols, and glycols (e.g. polypropylene glycols, polyethylene glycols, polyalkylene glycols). The conditioning agent may be dissolved in a solvent before being contacted with the crosslinked polymeric film, after which the solvent is removed.

In an embodiment, the isolated and dried crosslinked polymeric film (which may be provided on a supporting membrane) is contacted with a hydrophilic solvent. Suitably, the step of contacting (e.g. soaking or rinsing) the crosslinked polymeric film with the hydrophilic solvent is performed when the crosslinked polymeric film is completely dry (barring any conditioning agent that may have been introduced). The inventors have surprisingly found that when the dried crosslinked polymeric film is contacted with a hydrophilic solvent, the resulting membrane has notably increased flux in certain solvents. In particular, the inventors have found that such a hydrophilic solvent treatment step can significantly increase the flux of hydrophobic thin film membranes (such as those prepared from one or more compounds of formula (I) in which Q is hydrophobic) in non-polar solvents (e.g. hydrocarbon solvents, such as hexane and heptane). Exemplary hydrophilic solvents include acetone, methanol, ethanol and water.

In a particular embodiment, the isolated and dried crosslinked polymeric film (which may be provided on a supporting membrane) is sequentially contacted with (e.g. rinsed with or soaked in) the following solvents in the order specified: water, methanol, acetone, hexane, heptane, and toluene.

In another particular embodiment, the isolated and dried crosslinked polymeric film (which may be provided on a supporting membrane) is sequentially contacted with (e.g. rinsed with or soaked in) the following solvents in the order specified: water, acetone and toluene.

Thin Film Membranes

In a second aspect, there is provided a thin film membrane obtainable, obtained or directly obtained by the process according to the first aspect.

In a third aspect, there is provided a thin film membrane, the thin film membrane comprising/consisting essentially of/consisting of a plurality of interconnected moieties, each of formula (Ia), linked to one another to provide a crosslinked polymer:

$$T—Q—L—Y_a—L—Q—T \qquad (Ia)$$

in which each Q is a chemically-inert oligomer having a predetermined number of repeating units, m;

each L is a linking moiety through which each Q is covalently bonded to $Y_a$;

each T is a chemically-inert terminating group; and $Y_a$ is a group comprising at least two crosslinking moieties $Z_a$, wherein each crosslinking moiety $Z_a$ links one moiety of formula (Ia) to another moiety of formula (Ia).

As alluded to hereinbefore, the interfacial polymerisation process of the invention provides a straightforward, highly flexible and widely applicable route to a variety of thin film membranes having properties, e.g. flux characteristics, that are tuned to a target application. For example, the use of hydrophobic oligomers Q in the interfacial polymerisation process increases the hydrophobicity of the resulting thin film membrane, thereby making it more apt at separating non-polar liquids (e.g. hydrocarbon solvents, such as hexane or heptane). Alternatively, the use of oligomers Q containing charged groups or other functional groups may confer specific functionality to the resulting thin film membrane. The length of the oligomers Q—in terms of the number of repeating units contained therein—may affect the extent to which a given property (e.g. hydrophobicity) is exhibited by the resulting thin film membrane.

In an embodiment, the crosslinked polymer is one or more polymers selected from the group consisting of polyamide, polyester, aromatic polyhydrazide, sulfonated polyfurane, polypiperazine isophthalamde, polyepiamine-amide, polyepiamine-urea, polyethyleneimine-urea, polyether-amide, polyether-urea and polyester-amide. Suitably, the crosslinked polymer is a polyamide, a polyester or a polyether.

In a particular embodiment, the crosslinked polymer is a polyamide.

In a particular embodiment, the crosslinked polymer is a polyester.

Q, L and T of the third aspect of the invention may have any of those definitions appearing hereinbefore in relation to Q. L and T of the first aspect of the invention. Such groups are chemically-inert in the interfacial polymerisation process of the first aspect, such that they are present in an unaltered form in the third aspect. Preferred and suitable definitions of Q, L and T according to the first aspect are equally preferred and suitable definitions of Q, L and T according to the third aspect.

The moiety of formula (Ia) is linked to at least two other moieties of formula (la) at $Y_a$. $Y_a$ comprises at least two crosslinking moieties $Z_a$, wherein each crosslinking moiety $Z_a$ links one moiety of formula (Ia) to another moiety of formula (Ia). In an embodiment, $Y_a$ is a group comprising up to 10 crosslinking moieties $Z_a$. Suitably, $Y_a$ is a group comprising up to 8 crosslinking moieties $Z_a$. More suitably, $Y_a$ is a group comprising up to 6 crosslinking moieties $Z_a$.

In a particular embodiment, $Y_a$ comprises at least 3 crosslinking moieties $Z_a$. Suitably, $Y_a$ is a group comprising up to 10 crosslinking moieties $Z_a$. More suitably, $Y_a$ is a group comprising up to 8 crosslinking moieties $Z_a$. Even more suitably, $Y_a$ is a group comprising up to 6 crosslinking moieties $Z_a$.

In a particular embodiment, $Y_a$ is oligomeric having n number of repeating units. Suitably, each repeating unit n comprises one crosslinking moiety $Z_a$.

It will be understood that the thin film membranes are prepared by an interfacial polymerisation process, such that the exact configuration of each crosslinking moiety $Z_a$ depends on the identity (and chemistry) of the reactive monomers used in the interfacial polymerisation process. For example, where both of the reactive monomers used in the interfacial polymerisation process are compounds of formula (I), the resulting thin film membrane may be one in which each moiety of formula (Ia) is directly linked (e.g. via an ester, amide or ether linkage) to at least two other moieties of formula (Ia). Alternatively, where only one of the reactive monomers used in the interfacial polymerisation process is a compound of formula (I), the resulting thin film membrane may be one in which each moiety of formula (Ia) is linked to at least two other moieties of formula (Ia) via residues of the other reactive monomer used in the interfacial polymerisation process (e.g. via a residue of trimesoylchloride).

In a particular embodiment, $Y_a$ has the following structure:

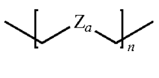

wherein each $Z_a$ is a point at which the moiety of formula (Ia) is connected to another moiety of formula (Ia); and n is 2-10 (e.g. 3 or 4 or 5).

In an embodiment, each $Z_a$ independently comprises at least one linking group selected from the list consisting of amide, ester, ether and urea.

In an embodiment, each $Z_a$ independently comprises a group of formula (A) below:

(A)

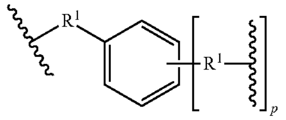

wherein each $R^1$ is independently an amide, ester or urea linkage; and p is 1 or 2 (suitably wherein $R^1$ groups are arranged meta or para to one another).

Suitably, each $R^1$ is independently an amide or an ester linkage. Most suitably, all $R^1$ groups are identical.

In an embodiment, $Y_a$ has a structure according to any one of the following:

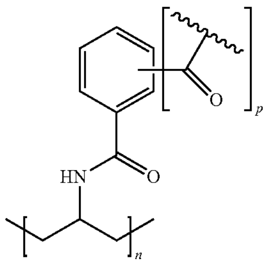

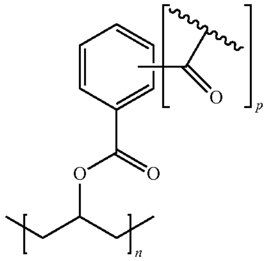

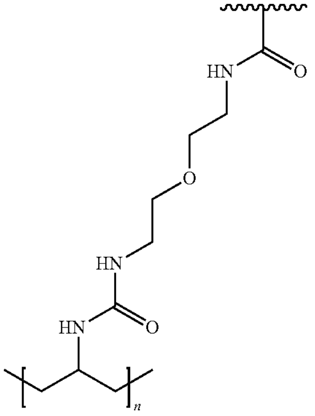

-continued

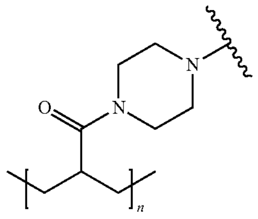

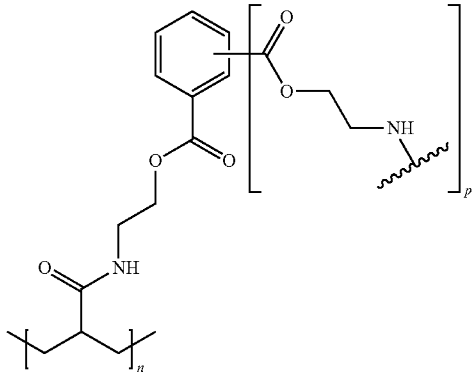

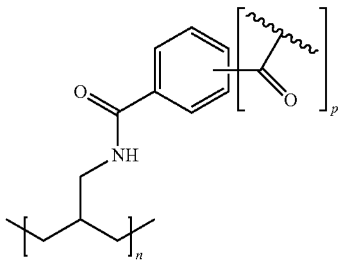

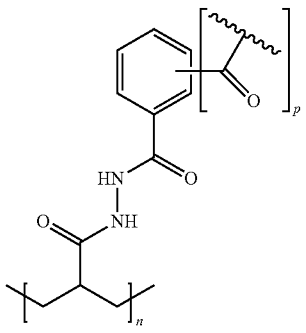

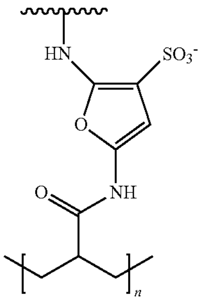

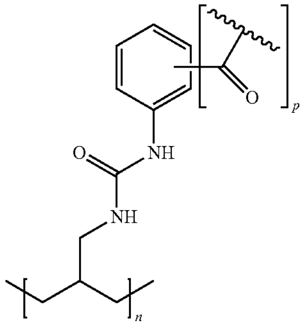

-continued

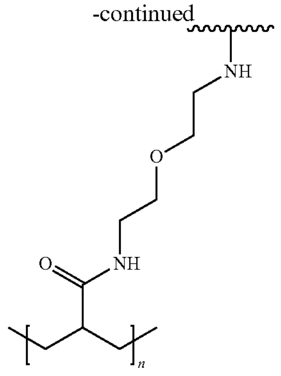

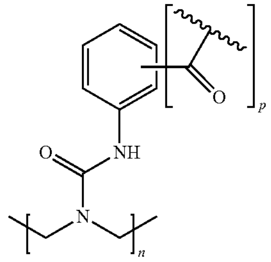

in which n is 2-10 (e.g. 3 or 4 or 5) and p is 1 or 2.

In a particular embodiment, each moiety of formula (Ia) has either of the following structures:

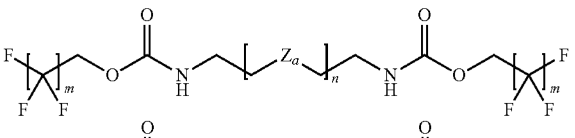

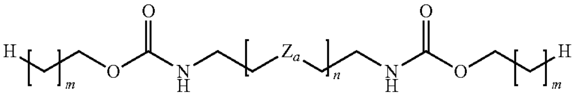

in which $Z_a$, n and m are independently as defined hereinbefore in relation to the first or third aspect.

In a particularly suitable embodiment, each moiety of formula (Ia) has the following structure:

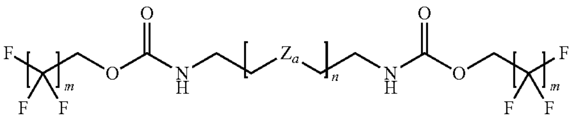

wherein m is 2-6;

n is 3-5; and each $Z_a$ independently comprises a group of formula (A) below:

(A)

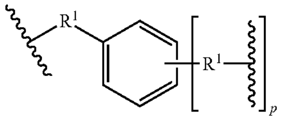

wherein each $R^1$ is independently an amide, ester or urea linkage; and p is 1 or 2 (suitably wherein $R^1$ groups are arranged meta or para to one another).

In a particular embodiment, the plurality of moieties of formula (Ia) each have any one of those structures appearing in FIG. 13.

In an embodiment, the thin film membrane is provided on a support membrane, such that it can be termed a thin film composite membrane. The support membrane may have any of those definitions appearing hereinbefore in relation to the first aspect.

In an embodiment, the plurality of interconnected moieties of formula (Ia) accounts for greater than 75 wt % of the thin film membrane (not including any support membrane that may be present). Suitably, the plurality of interconnected moieties of formula (Ia) accounts for greater than 85 wt % of the thin film membrane. More suitably, the plurality of interconnected moieties of formula (Ia) accounts for greater than 90 wt % of the thin film membrane. Even more suitably, the plurality of interconnected moieties of formula (Ia) accounts for greater than 95 wt % of the thin film membrane. Most suitably, the plurality of interconnected moieties of formula (Ia) accounts for greater than 98 wt % of the thin film membrane.

It will be recognsied that a variety of conventional membrane shapes (spiral would, flat sheet, tubular, etc) are useful and can be employed as part of the present invention.

Applications of the Thin Film Membranes

In a fourth aspect, the present invention provides a use of a thin film membrane according to the second or third aspect in a process for isolating one or more components from a mixture.

In a fifth aspect, the present invention provides a process for isolating one or more compounds from a mixture, the process comprising the step of contacting the mixture with the thin film membrane according to the second or third aspect.

The following embodiments are applicable to the fourth and fifth aspects of the invention.

In an embodiment, the process for isolating one or more components from a mixture is a process selected from the list consisting of gas separation, pervaporation, reverse osmosis, nanofiltration, desalination and water treatment.

It will be understood that gas separation includes the separation of binary, ternary and multicomponent mixtures, including those of oxygen, nitrogen, hydrogen, carbon dioxide and methane.

In an embodiment, the process for isolating one or more components from a mixture is one wherein the mixture from which the one or more components is to be isolated is a liquid, In an embodiment, the process for isolating one or more components from a mixture is a nanofiltration process. Suitably, the mixture comprises at least one organic solvent.

In a particularly suitable embodiment, the process for isolating one or more components from a mixture is a nanofiltration process and the mixture comprises one or more non-polar solvents (e.g. hydrocarbon solvents, such as hexane or heptane) and the one or more components to be separated are solutes.

In a particularly suitable embodiment, the process for isolating one or more components from a mixture is a nanofiltration process and the mixture comprises at least 50 wt % (or at least 70 wt %, or at least 90 wt %) of one or more non-polar solvents selected from the list consisting of hexane, heptane and toluene, and the one or more components to be separated are solutes.

When the one or more components to be separated are solutes, they suitably each have a molecular weight of less than 2000 g $mol^{-1}$. More suitably, the solutes have a molecular weight of less than 1000 g $mol^{-1}$. Even more suitably, the solutes have a molecular weight of less than 500 g $mol^{-1}$. Most suitably, the solutes have a molecular weight of less than 450 g $mol^{-1}$.

In an embodiment, the mixture is a plurality of different hydrocarbons that are present in crude oil. Suitably, the plurality comprises more than 5 or 10 or 15 different hydrocarbons. Alternatively, the mixture may be crude oil. In such embodiments, the thin film membrane may have a molecular weight cut-off (MWCO) of <500 g $mol^{-1}$, more suitably <300 g $mol^{-1}$.

The following numbered statements 1 to 92 are not claims, but instead serve to define particular aspects and embodiments of the claimed invention:

1. An interfacial polymerisation process for the preparation of a thin film membrane, the process comprising the step of reacting a first monomer and a second monomer at the interface of two immiscible liquids to produce a crosslinked polymeric film;

wherein the crosslinked polymeric film is composed of at least one crosslinked polymer; and at least one of the first monomer and second monomer is a compound of formula (I) shown below:

$$T—Q—L—Y—L—Q—T \quad (I)$$

in which each Q is a chemically-inert oligomer having a predetermined number of repeating units, m;

Y is a reactive moiety comprising at least 2 groups capable of reacting with the other of the first monomer and second monomer to produce the crosslinked polymeric film;

each L is a linking moiety through which each Q is covalently bonded to Y; and each T is a chemically-inert terminating group.

2. The process of statement 1, wherein the crosslinked polymeric film is composed of at least one crosslinked polymer selected from the group consisting polyamide, polyester, aromatic polyhydrazide, sulfonated polyfurane, polypiperazine isophthalamde, polyepiamine-amide, polyepiamine-urea, polyethyleneimine-urea, polyether-amide, polyether-urea and polyester-amide.

3. The process of statement 1, wherein the crosslinked polymeric film is composed of at least one crosslinked polymer selected from the group consisting of polyamide, polyester and polyether.

4. The process of statement 1, 2 or 3, wherein m is 2 to 20.

5. The process of statement 4, wherein m is 2 to 15.

6. The process of statement 4, wherein m is 2 to 10.

7. The process of statement 4, wherein m is 2 to 8.

8. The process of statement 4, wherein m is 2 to 6.

9. The process of any preceding statement, wherein Q is selected from the group consisting of:

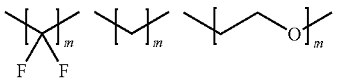

-continued

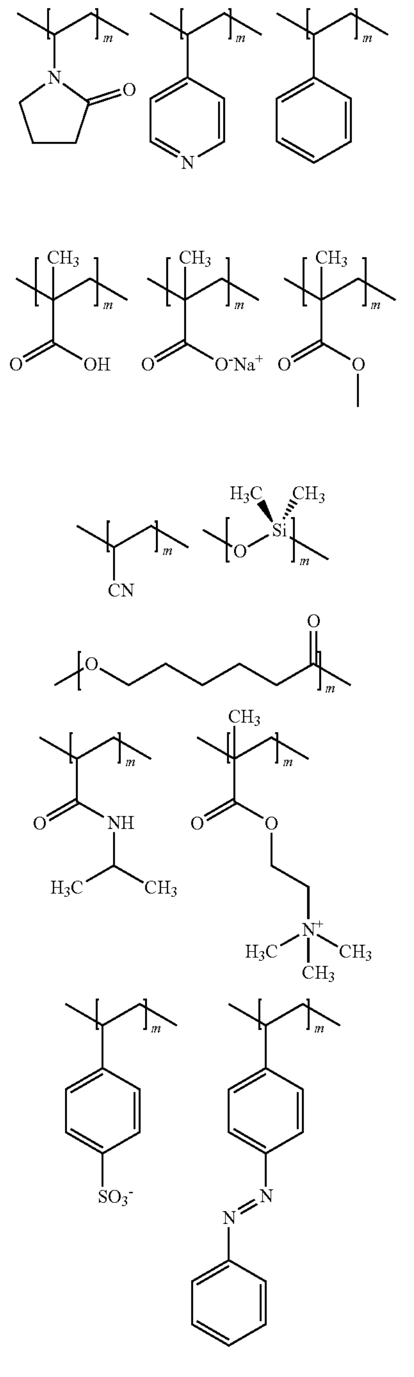

10. The process of any preceding statement, wherein the compound of formula (I) has a hydrophilic-lipophilic balance of >10.

11. The process of statement 10, wherein Q is selected from the group consisting of:

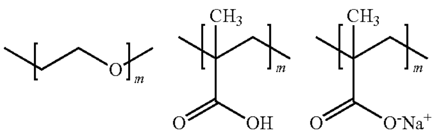

-continued

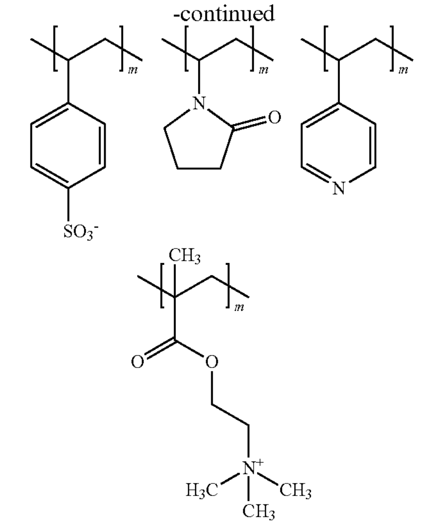

12. The process of any one of statement 1 to 9, wherein the compound of formula (I) has a hydrophilic-lipophilic balance of <10

13. The process of statement 12, wherein the compound of formula (I) has a hydrophilic-lipophilic balance of ≤6

14 The process of statement 12 or 13, wherein Q is selected from the group consisting of:

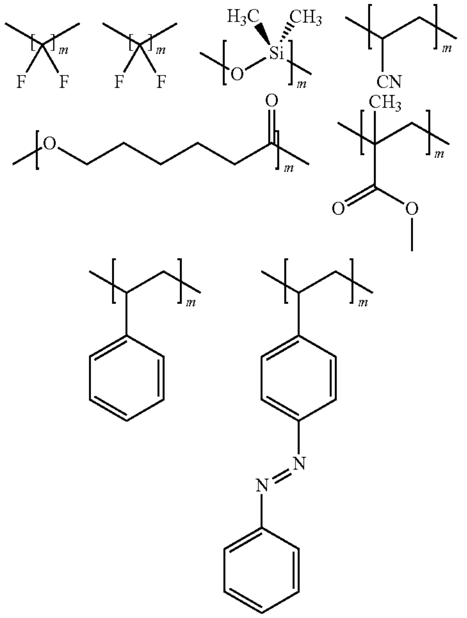

15. The process of any preceding statement, wherein each T is selected from the group consisting of —H, —F, —$CH_3$, —$OCH_3$, —$OCH_2C_6H_5$, PmbS (4-methoxybenzyl thioether), —CH=$CH_2$, —C≡CH, —OTs, —$N_3^+$, —SH, —COOH and —$SO_3^-$.

16. The process of any preceding statement, wherein each L contains fewer than 20 backbone atoms.

17. The process of any preceding statement, wherein each L is an amido group.

18. The process of any preceding statement, wherein Y comprises at least 3 reactive groups.

19. The process of any preceding statement, wherein Y comprises 3-10 reactive groups.

20. The process of any preceding statement, wherein Y comprises 3-8 reactive groups.

21. The process of any preceding statement, wherein Y comprises 3-6 reactive groups.

22. The process of any preceding statement, wherein the reactive groups present in Y are independently selected from the group consisting of $—NH_2$, —NH—, —OH, —C(═O)X (wherein X is halo) and $—C(═O)NH—NH_2$.

23. The process of any preceding statement, wherein all of the reactive groups present in Y are identical.

24. The process of any preceding statement, wherein Y is oligomeric having n number of repeating units, and wherein each repeating unit n comprises one of the reactive groups.

25. The process of statement 24, wherein Y has the following structure:

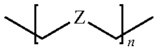

wherein each Z is independently selected from the group consisting of:

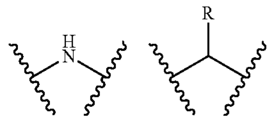

where R is selected from the group consisting of $—(CH_2)_vOH$, $—(CH_2)_vNH_2$, $—(CH_2)_vC(═O)X$ and $—(CH_2)_vC(═O)NHNH_2$, in which v is 0-4 and X is halo.

26. The process of any preceding statement, wherein the compound of formula (I) has a structure according to any of the following:

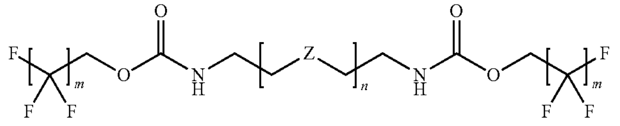

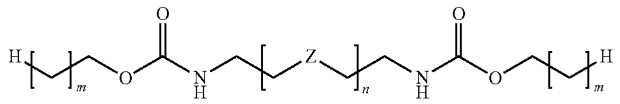

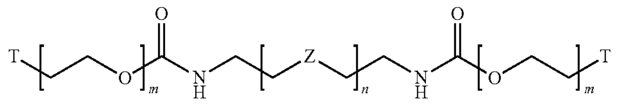

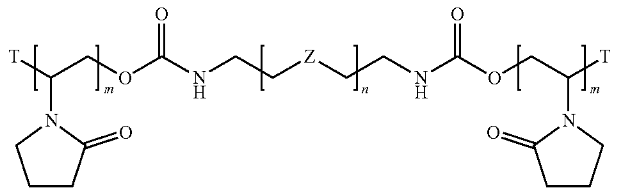

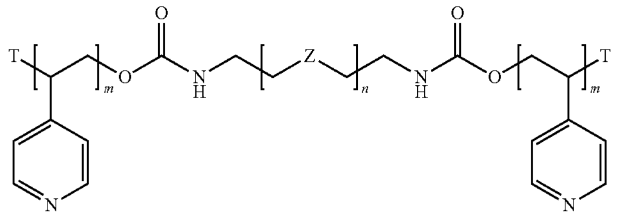

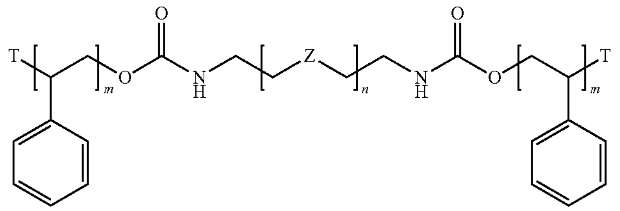

-continued
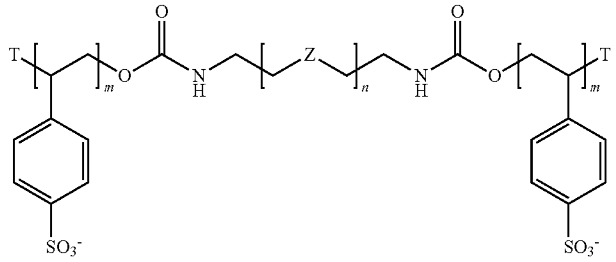
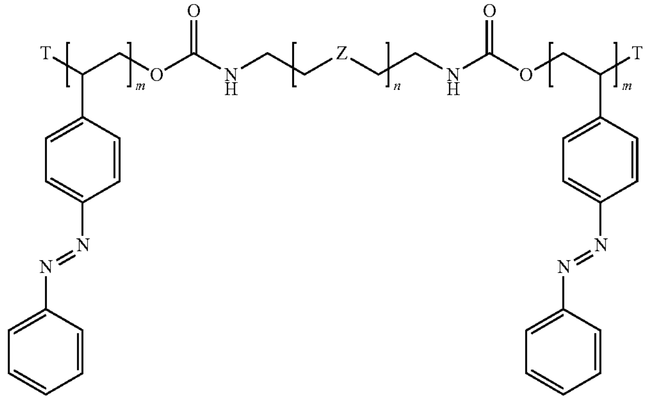
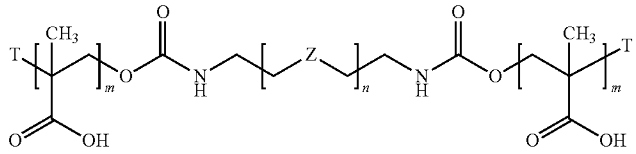
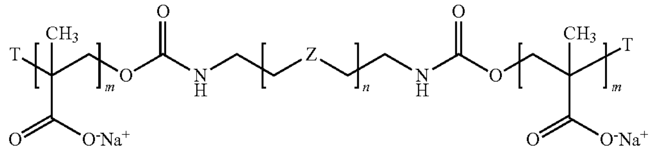
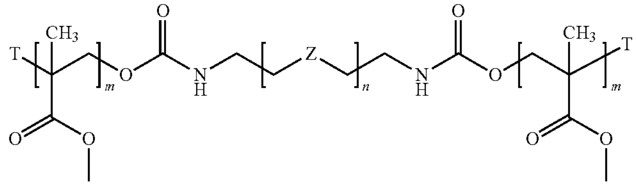
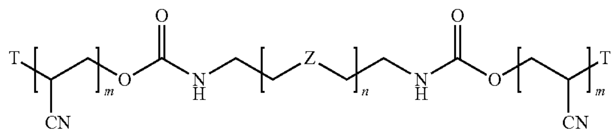
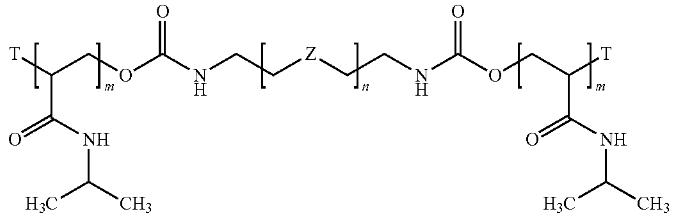

-continued

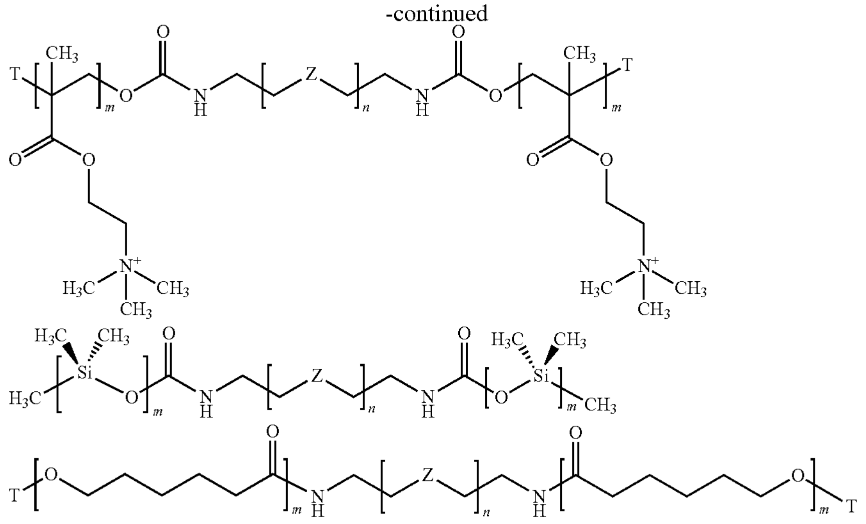

wherein T, m, Z and n are as defined in any preceding statement.

27. The process of any preceding statement, wherein the compound of formula (I) has either of the following structures:

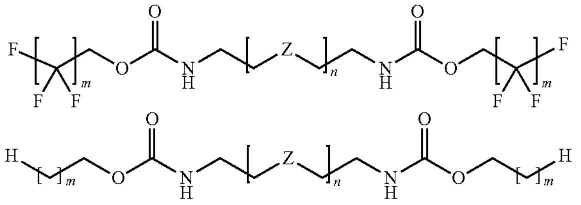

wherein m, n and Z are as defined in any preceding statement.

28. The process of statement 26 or 27, wherein Z is —NH—, —CH(OH)— or —CH(R)—, where R is a group —C(═O)Cl, m is 2-6, and n is 3-5.

29. The process of any preceding statement, wherein only the first monomer is a compound of formula (I).

30. The process of statement 29, wherein the second monomer is a polyacylhalide, a polyamine or a polyhydroxy compound.

31. The process of statement 29 or 30, wherein the first monomer is a compound of formula (I) in which Y comprises 3-6 reactive groups selected from the group consisting of —$NH_2$, —NH—, and —OH, and the second monomer is a polyacylhalide.

32. The process of statement 29 or 30, wherein the first monomer is a compound of formula (I) in which Y comprises 3-6 reactive groups selected from the group consisting of —$NH_2$ and —NH—, and the second monomer is a polyacylhalide.

33. The process of statement 31 or 32, wherein the polyacylhalide is trimesoylchloride, isophthaloyl chloride or sebacoyl chloride.

34. The process of statement 29 or 30, wherein the first monomer is a compound of formula (I) in which Y comprises 3-6 reactive groups being —C(═O)X in which X is halo (i.e. acyl halide), and the second monomer is a polyamine (e.g. an aromatic diamine or triamine, such m-phenyl diamine) or a polyhydroxy compound.

35. The process of any one of statements 1 to 28, wherein:

(A) the first monomer is a compound of formula (I) in which Y comprises —$NH_2$ reactive groups, and the second monomer is a polyacylhalide, such that the crosslinked polymer is a polyamide; or (B) the first monomer is a compound of formula (I) in which Y comprises —OH reactive groups, and the second monomer is a polyacylhalide, such that the crosslinked polymer is a polyester; or (C) the first monomer is a compound of formula (I) in which Y comprises —C(═O)NH—$NH_2$ reactive groups, and the second monomer is an aromatic polyacylhalide, such that the crosslinked polymer is an aromatic polyhydrazide; or (D) the first monomer is a compound of formula (I) in which Y comprises —C(═O)X (wherein X is halo) reactive groups, and the second monomer is:

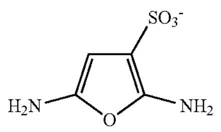

such that the crosslinked polymer is a sulfonated polyfurane; or (E) the first monomer is a compound of formula (I) in which Y comprises —C(═O)X (wherein X is halo) reactive groups, and the second monomer is piperazine, such that the crosslinked polymer is a polypiperazine isophthalamide; or (F) the first monomer is a compound of formula (I) in which Y comprises —$CH_2NH_2$ reactive groups, and the second monomer is a polyacylhalide, such that the crosslinked polymer is a polyepiamine-amide; or (G) the first monomer is a compound of formula (I) in which Y comprises —$CH_2NH_2$ reactive groups, and the second monomer is phenylene diisocyanate, such that the crosslinked polymer is a polyepiamine-urea; or (H) first monomer is a compound of formula (I) in which Y comprises —NH— reactive groups, and the second monomer is phenylene diisocyanate, such that the crosslinked polymer is a polyethyleneimine-urea;

or (I) the first monomer is a compound of formula (I) in which Y comprises —C(═O)X (wherein X is halo), and the second monomer is:

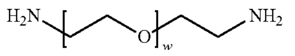

in which w is 1-4, such that the crosslinked polymer is a polyethyleneimine-urea;

or (J) the first monomer is a compound of formula (I) in which Y comprises —$NH_2$ reactive groups, and the second monomer is:

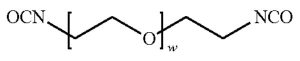

in which w is 1-4, such that the crosslinked polymer is a polyether-urea;

or (K) the first monomer is a compound of formula (I) in which Y comprises —C(═O)X (wherein X is halo), and the second monomer is:

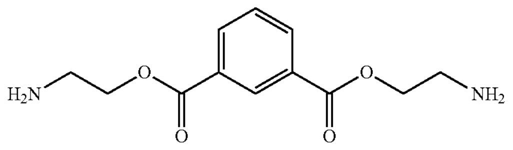 [SMILES: NCCOC(=O)c1cccc(C(=O)OCCN)c1]

such that the crosslinked polymer is a polyester-amide.

36. The process of any one of statements 1 to 28, wherein the first monomer and the second monomer are independently compounds of formula (I).

37. The process of statement 36 wherein Q, L and T in the first monomer are the same as Q, L and T in the second monomer.

38. The process of statement 36, wherein Q, L and T in the first monomer are not the same as Q, L and T in the second monomer.

39. The process of statement 36, 37 or 38, wherein in the first monomer, Y comprises 3-6 reactive groups selected from the group consisting of —$NH_2$, —NH—, and —OH; and in the second monomer, Y comprises 3-6 reactive groups being —C(O)X, wherein X is halo.

40. The process of statement 36, 37 or 38, wherein in the first monomer, Y comprises 3-6 reactive groups selected from the group consisting of —$NH_2$ and —NH—; and in the second monomer, Y comprises 3-6 reactive groups being —C(O)X, wherein X is halo.

41. The process of any preceding statement, wherein the step of reacting a first monomer and a second monomer at the interface of two immiscible liquids to produce a crosslinked polymeric film comprises the steps of:

(a) providing a first solution comprising:

(i) a first solvent, and (ii) the first monomer;

(b) contacting the first solution with a second solution, the second solution comprising:

(i) a second solvent, the second solvent being immiscible in the first solvent, and (ii) the second monomer;

wherein reaction of the first monomer with the second monomer in step (b) results in the formation of the crosslinked polymeric film at the interface of the first solvent and the second solvent.

42. The process of statement 41, wherein the first solvent is water.

43. The process of statement 42, wherein the first solvent comprises up to 30 wt % of a solubility enhancer.

44. The process of statement 41, 42 or 43, wherein the second solvent is at least one organic solvent.

45. The process of statement 44, wherein the at least one organic solvent is selected from the list consisting of hexane, heptane, toluene and xylene.

46. The process of any one of statements 41 to 45, wherein the first solution comprises 0.005-30.0 wt. % of the first monomer.

47. The process of any one of statements 41 to 46, wherein the first solution comprises 0.01-15.0 wt. % of the first monomer.

48. The process of any one of statements 41 to 47, wherein the first solution comprises 0.02-5.0 wt. % of the first monomer.

49. The process of any one of statements 41 to 48, wherein the second solution comprises 0.005-30.0 wt. % of the second monomer.

50. The process of any one of statements 41 to 49, wherein the second solution comprises 0.01-15.0 wt. % of the second monomer.

51. The process of any one of statements 41 to 50, wherein the second solution comprises 0.02-5.0 wt. % of the second monomer.

52. The process of any one of statements 41 to 51, wherein the crosslinked polymeric film is formed on a supporting membrane during step (b).

53. The process of any one of statements 41 to 51, wherein the crosslinked polymeric film is formed at the free interface between the first solvent and second solvent during step (b) and is subsequently transferred onto a supporting membrane.

54. The process of statement 52 or 53, wherein the supporting membrane is polymeric.

55. The process of statement 54, wherein the polymeric supporting membrane is composed of one or more polymers selected from the group consisting of polysulfone, polyethersulfone, poly(ether sulfone ketone), polyacrylonitrile, polypropylene, polyamide, cellulose acetate, cellulose diacetate, cellulose triacetate, poly(ether ethyl ketone), poly (pthalazinone ether sulfone ketone), a perfluoropolymer, polyimide, polybenzimidazole, sulfonated polyether ether ketone and crosslinked versions thereof.

56. The process of statement 55, wherein the polymeric supporting membrane is composed of polyacrylonitrile.

57. The process of statement 54, 55 or 56, wherein the supporting membrane is provided on a backing material (e.g. a non-woven material, such as non-woven polyethylene terephthalate).

58. The process of statement 52 or 53, wherein the supporting membrane is selected from the group consisting of silicon carbide, silicon oxide, zirconium oxide, titanium oxide, aluminium oxide and zeolite.

59. The process of any one of statements 41 to 58, wherein the process further comprises the step (c) of isolating and drying the crosslinked polymeric film.

60. The process of statement 59, wherein the isolated and dried crosslinked polymeric film is contacted with a hydrophilic solvent.

61. The process of statement 60, wherein the hydrophilic solvent is one or more solvents selected from the group consisting of acetone, ethanol, methanol, isopropanol and water.

62. The process of statement 60, wherein the hydrophilic solvent is acetone.

63. The process of any one of statements 59 to 62, wherein the isolated and dried crosslinked polymeric film is contacted with a conditioning agent.

64. The process of statement 59, wherein the isolated and dried crosslinked polymeric film is contacted with a cleaving agent 65. A thin film membrane obtained, directly obtained or obtainable by the process of any preceding statement.

66. A thin film membrane comprising a plurality of interconnected moieties, each of formula (Ia), linked to one another to provide a crosslinked polymer:

$$T—Q—L—Y_a—L—Q—T \quad \text{(Ia)}$$

in which each Q is a chemically-inert oligomer having a predetermined number of repeating units, m;

each L is a linking moiety through which each Q is covalently bonded to $Y_a$;

each T is a chemically-inert terminating group; and $Y_a$ is a group comprising at least two crosslinking moieties $Z_a$, wherein each crosslinking moiety $Z_a$ links one moiety of formula (Ia) to another moiety of formula (Ia).

67. The thin film membrane of statement 66, wherein each Q is as defined in any of numbered statements 4-9, 11 and 14.

68. The thin film membrane of statement 66 or 67, wherein each L is as defined in numbered statement 15.

69. The thin film membrane of statement 66, 67 or 68, wherein each T is as defined in numbered statement 16 or 17.

70. The thin film membrane of any one of statements 66 to 69, wherein $Y_a$ is a group comprising up to 10 crosslinking moieties $Z_a$.

71. The thin film membrane of any one of statements 66 to 70, wherein $Y_a$ is a group comprising up to 10 crosslinking moieties $Z_a$.

71. The thin film membrane of any one of statements 66 to 71, wherein $Y_a$ is a group comprising up to 10 crosslinking moieties $Z_a$.

73. The thin film membrane of any one of statements 66 to 72, wherein $Y_a$ is a group comprising at least 3 crosslinking moieties $Z_a$.

74. The thin film membrane of any one of statements 66 to 73, wherein $Y_a$ is oligomeric having n number of repeating units, wherein each repeating unit n comprises one crosslinking moiety $Z_a$.

75. The thin film membrane of statement 74, wherein $Y_a$ has the following structure:

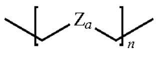

wherein each $Z_a$ is a point at which the moiety of formula (Ia) is connected to another moiety of formula (Ia); and n is 2-10 (e.g. 3 or 4 or 5).

76. The thin film membrane of any one of statements 66 to 75, wherein each $Z_a$ independently comprises at least one linking group selected from the list consisting of amide, ester and urea.

77. The thin film membrane of any one of statements 66 to 76, wherein each $Z_a$ independently comprises a group of formula (A) below:

(A)

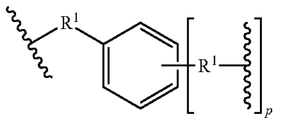

wherein each $R^1$ is independently an amide, ester or ether linkage; and p is 1 or 2 (suitably wherein $R^1$ groups are arranged meta or para to one another).

78. The thin film membrane of statement 77, wherein each $R^1$ is independently an amide or an ester linkage.

79. The thin film membrane of any one of statements 66 to 75, wherein $Y_a$ has a structure according to any one of the following:

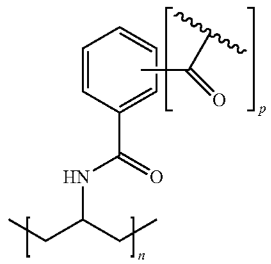

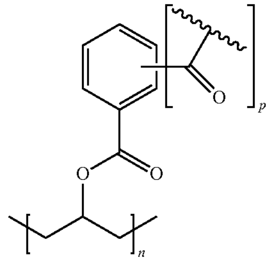

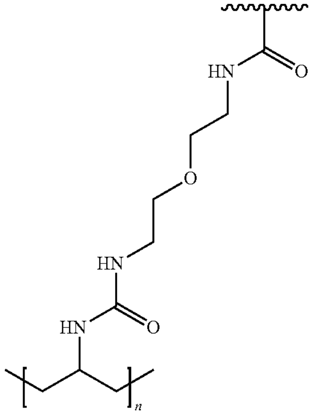

-continued
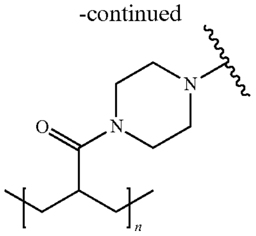
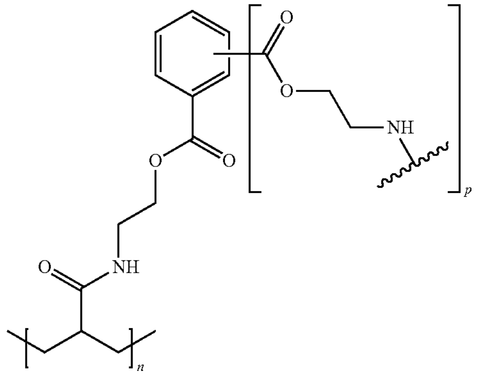
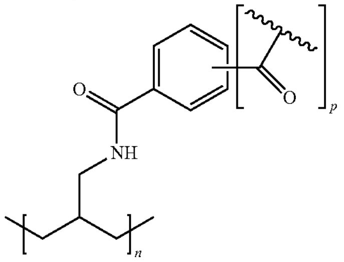
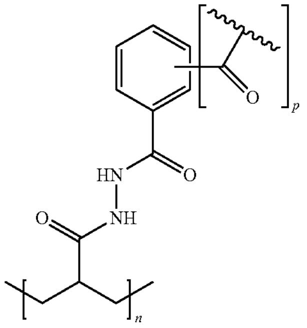
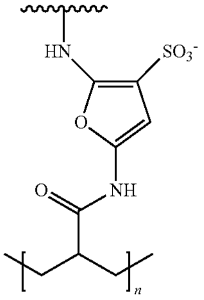
-continued
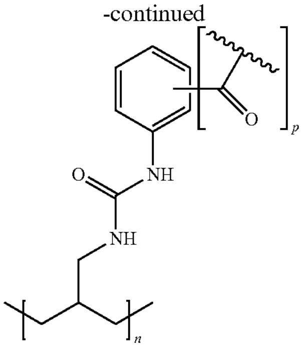
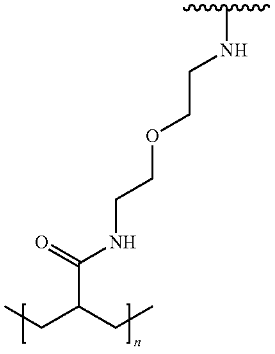
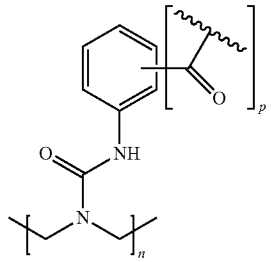
in which n is 2-10 (e.g. 3 or 4 or 5) and p is 1 or 2.
80. The thin film membrane of any one of statements 66 to 79, wherein each moiety of formula (Ia) has any one of the following structures:
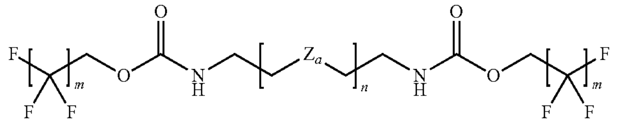
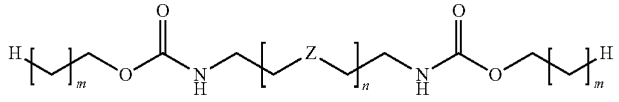
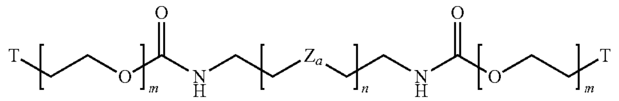

-continued
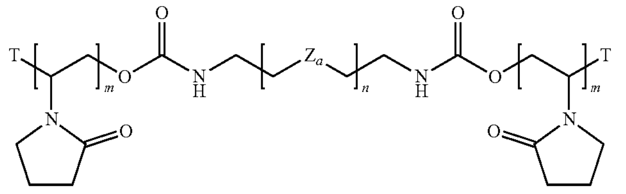
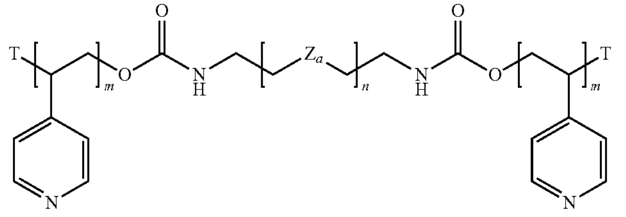
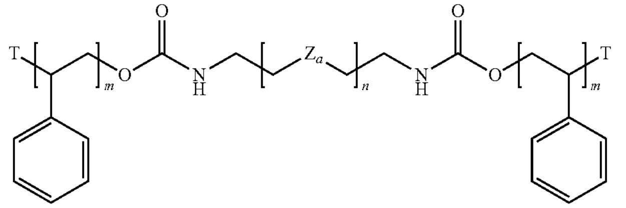
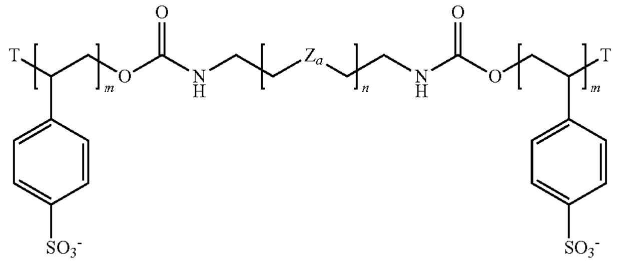
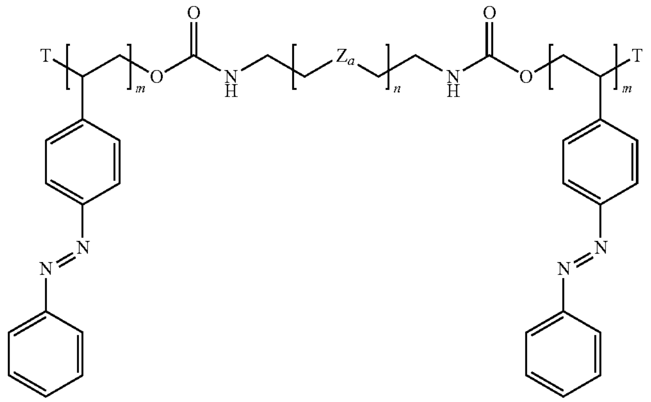
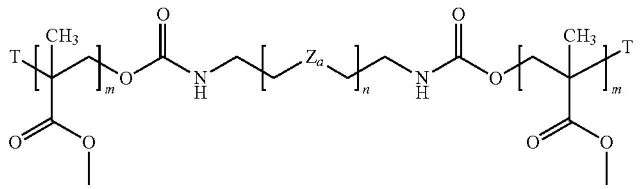
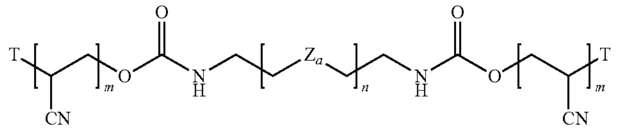

-continued

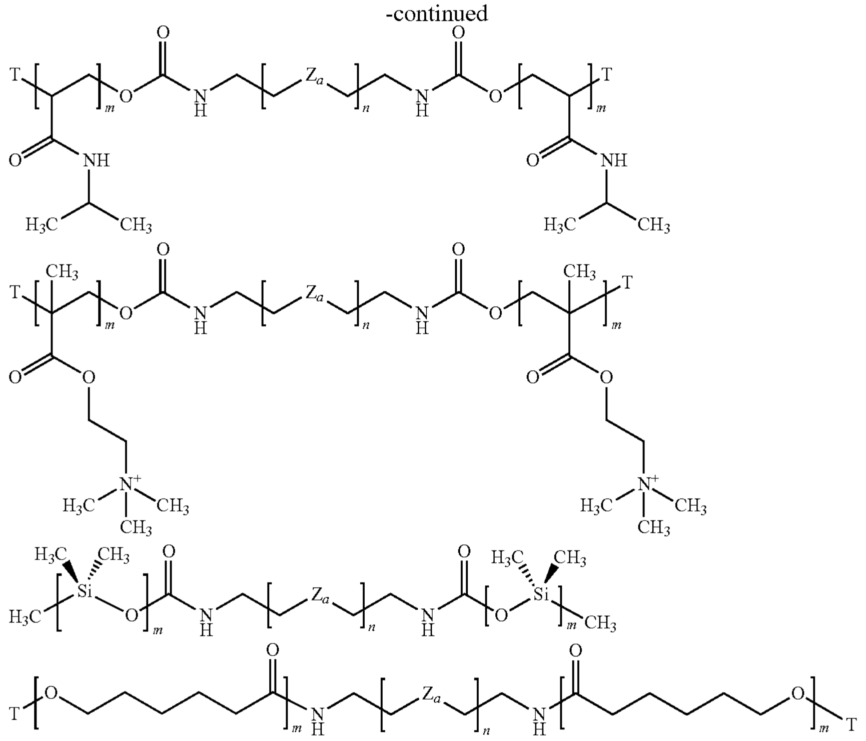

in which $Z_a$, m, n and T are as defined in any preceding statement.

81. The thin film membrane of any one of statements 66 to 80, wherein each moiety of formula (Ia) has either of the following structures:

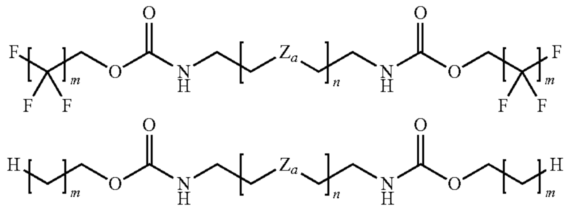

in which $Z_a$, m and n are as defined in any preceding statement.

82. The thin film membrane of any one of statements 66 to 81, wherein the thin film membrane is provided on a support membrane.

83. The thin film membrane of any one of statements 66 to 82, wherein the plurality of interconnected moieties of formula (la) accounts for greater than 75 wt % of the thin film membrane.

84. The thin film membrane of any one of statements 66 to 83, wherein the plurality of interconnected moieties of formula (la) accounts for greater than 95 wt % of the thin film membrane.

85. Use of the thin film membrane of any one of statements 65 to 84 in a process for isolating one or more components from a mixture.

86. The use of statement 85, wherein the process for isolating one or more components from a mixture is a process selected from the list consisting of gas separation, pervaporation, reverse osmosis, nanofiltration, desalination and water treatment 87. The use of statement 85 or 86, wherein the process for isolating one or more components from a mixture is one wherein the mixture from which the one or more components is to be isolated is a liquid.

88. The use of statement 85, 86 or 87, wherein the process for isolating one or more components from a mixture is a nanofiltration process.

89. The use of statement 85, 86 or 87, wherein the process for isolating one or more components from a mixture is a nanofiltration process and the mixture comprises one or more non-polar solvents (e.g. hydrocarbon solvents, such as hexane or heptane) and the one or more components to be separated are solutes.

90. The use of statement 85, 86 or 87, wherein the process for isolating one or more components from a mixture is a nanofiltration process and the mixture comprises at least 50 wt % (or at least 70 wt %, or at least 90 wt %) of one or more non-polar solvents selected from the list consisting of hexane, heptane and toluene, and the one or more components to be separated are solutes.

91. The use of statement 87, 89 or 90, wherein the solutes each have a molecular weight of less than 2000 g $mol^{-1}$.

92. The use of statement 87, 89 or 90, wherein the solutes each have a molecular weight of less than 500 g $mol^{-1}$.

93. The use of statement 85, 86 or 87, wherein the mixture is a plurality of different hydrocarbons that are present in crude oil.

94. The use of statement 85, 86 or 87, wherein the mixture is crude oil.

EXAMPLES

One or more examples of the invention will now be described, for the purpose of illustration only, with reference to the accompanying figures, in which:

FIG. 1 shows permeances of a TFC-1-MOM-1 membrane prepared from MOM-1 on PAN support for a range of solvents tested in the order water, methanol, acetone, hexane, heptane, and toluene. Nanofiltration of a pure solution has been performed at 10 bar and 25° C.

FIG. 2 shows the molecular weight cut-off (MWCO) curve of a TFC-1-MOM-1 membrane prepared from MOM-1 on PAN support for a range of dyes with molecular weight varying from ~200 to 800 g·mol$^{-1}$. Nanofiltration of a feed solution comprising dye molecules dissolved in methanol has been performed at 10 bar and 25° C., after testing with pure solvents in the order water, methanol, acetone, hexane, heptane, and toluene.

FIG. 3 shows permeances of a TFC-1-MOM-2 membrane prepared from MOM-2 on PAN support for a range of solvents including water, methanol, acetone, hexane, heptane, and toluene. The solvents were tested in the order water, methanol, acetone, hexane, heptane and toluene. Nanofiltration of a pure solution has been performed at 10 bar and 25° C.

FIG. 4 shows the MWCO curve of a TFC-1-MOM-2 membrane prepared from MOM-2 on PAN support for a range of dyes with molecular weight varying from ~200 to 800 g·mol$^{-1}$. Nanofiltration of a feed solution comprising dye molecules dissolved in methanol has been performed at 10 bar and 25° C. after testing with pure solvents in the order water, methanol, acetone, hexane, heptane, and toluene FIG. 5 shows permeances of a TFC-1-MOM-3 membrane prepared from MOM-3 on PAN support for a range of solvents tested in the order water, methanol, acetone, hexane, heptane, and toluene. Nanofiltration of a pure solution has been performed at 10 bar and 25° C.

FIG. 6 shows the MWCO curve of a TFC-1-MOM-3 membrane prepared from MOM-3 on PAN support for a range of dyes with molecular weight varying from ~200 to 800 g·mol$^{-1}$. Nanofiltration of a feed solution comprising dye molecules dissolved in methanol has been performed at 10 bar and 25° C. after testing with pure solvents in the order water, methanol, acetone, hexane, heptane, and toluene FIG. 7 shows permeances of a TFC-2-MOM-3 membrane prepared from MOM-4 on PAN support for a range of solvents tested in the order water, methanol, acetone, hexane, heptane, and toluene. Nanofiltration of a pure solution has been performed at 10 bar and 25° C.

FIG. 8 shows the MWCO curve of a TFC-2-MOM-3 membrane prepared from MOM-4 on PAN support fora range of dyes with molecular weight varying from ~200 to 800 g·mol$^{-1}$. Nanofiltration of a feed solution comprising dye molecules dissolved in methanol has been performed at 10 bar and 25° C. after testing with pure solvents in the order water, methanol, acetone, hexane, heptane, and toluene FIG. 9 shows permeances of a TFC-1-MOM-4 membrane prepared from MOM-5 on PAN support for a range of solvents tested in the order water, methanol, acetone, hexane, heptane, and toluene. Nanofiltration of a pure solution has been performed at 10 bar and 25° C.

FIG. 10 shows the MWCO curve of a TFC-1-MOM-4 membrane prepared from MOM-5 on PAN support for a range of dyes with molecular weight varying from ~200 to 800 g·mol$^{-1}$. Nanofiltration of a feed solution comprising dye molecules dissolved in methanol has been performed at 10 bar and 25° C. after testing with pure solvents in the order water, methanol, acetone, hexane, heptane, and toluene FIG. 11 shows the MWCO curve of a TFC-1-MOM-1 membrane prepared from MOM-1 on PAN support for a mixture of polystyrene (PS) with molecular weight varying from ~300 to 1000 g·mol$^{-1}$. Nanofiltration of a feed solution comprising PS molecules dissolved in heptane has been performed at 10 bar and 25° C.

FIG. 12 shows the MWCO curve of a TFC-1-MOM-2 membrane prepared from MOM-2 on PAN support for a mixture of polystyrene (PS) with molecular weight varying from ~300 to 1000 g·mol$^{-1}$. Nanofiltration of a feed solution comprising PS molecules dissolved in heptane has been performed at 10 bar and 25° C.

FIG. 13 shows (a) exemplary preparation of a polyamide crosslinked polymer according to the invention; (b) exemplary preparation of a polyester crosslinked polymer according to the invention; (c) exemplary preparation of an aromatic polyhydrazide crosslinked polymer according to the invention; (d) exemplary preparation of a sulfonated polyfurane crosslinked polymer according to the invention; (e) exemplary preparation of a polypiperazine isophthalamide crosslinked polymer according to the invention; (f) exemplary preparation of a polyepiamine-amide crosslinked polymer according to the invention; (g) exemplary preparation of a polyepiamine-urea crosslinked polymer according to the invention; (h) exemplary preparation of a polyethyleneimine-urea crosslinked polymer according to the invention; (i) exemplary preparation of a polyether-amide crosslinked polymer according to the invention; (j) exemplary preparation of a polyether-urea crosslinked polymer according to the invention; (k) exemplary preparation of a polyester-amide crosslinked polymer according to the invention.

Figure 16A:
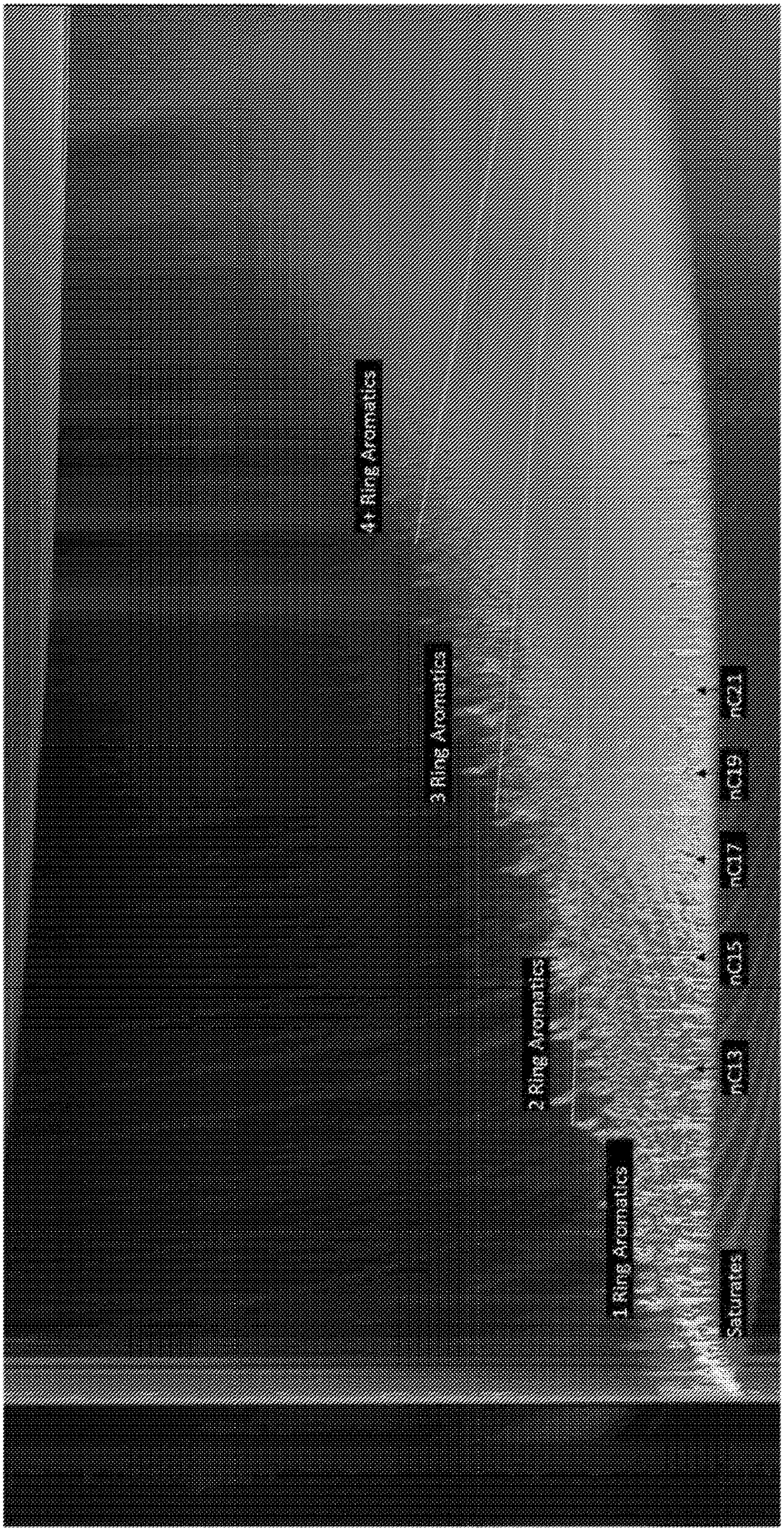
Figure 16B:
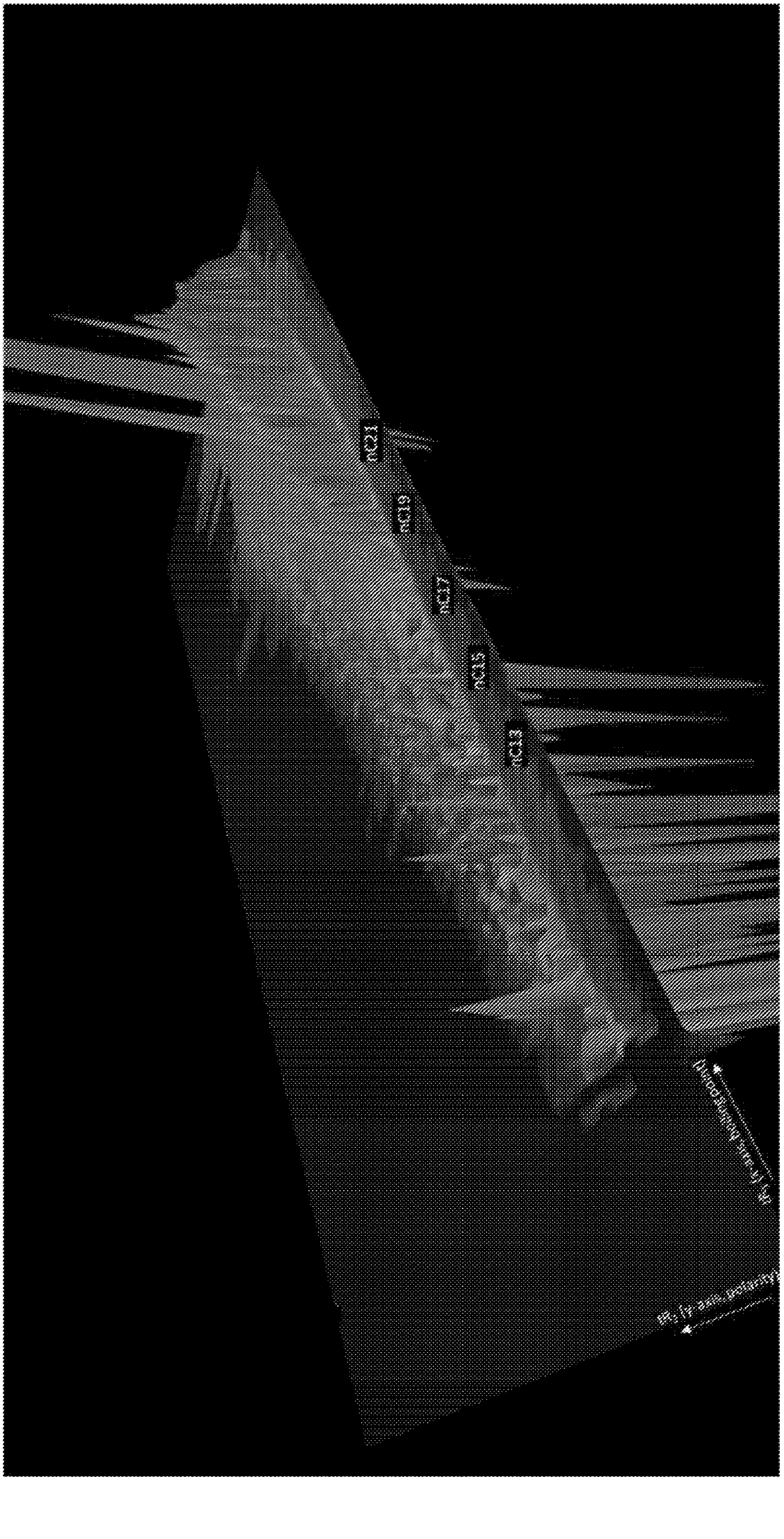
Figure 16C:
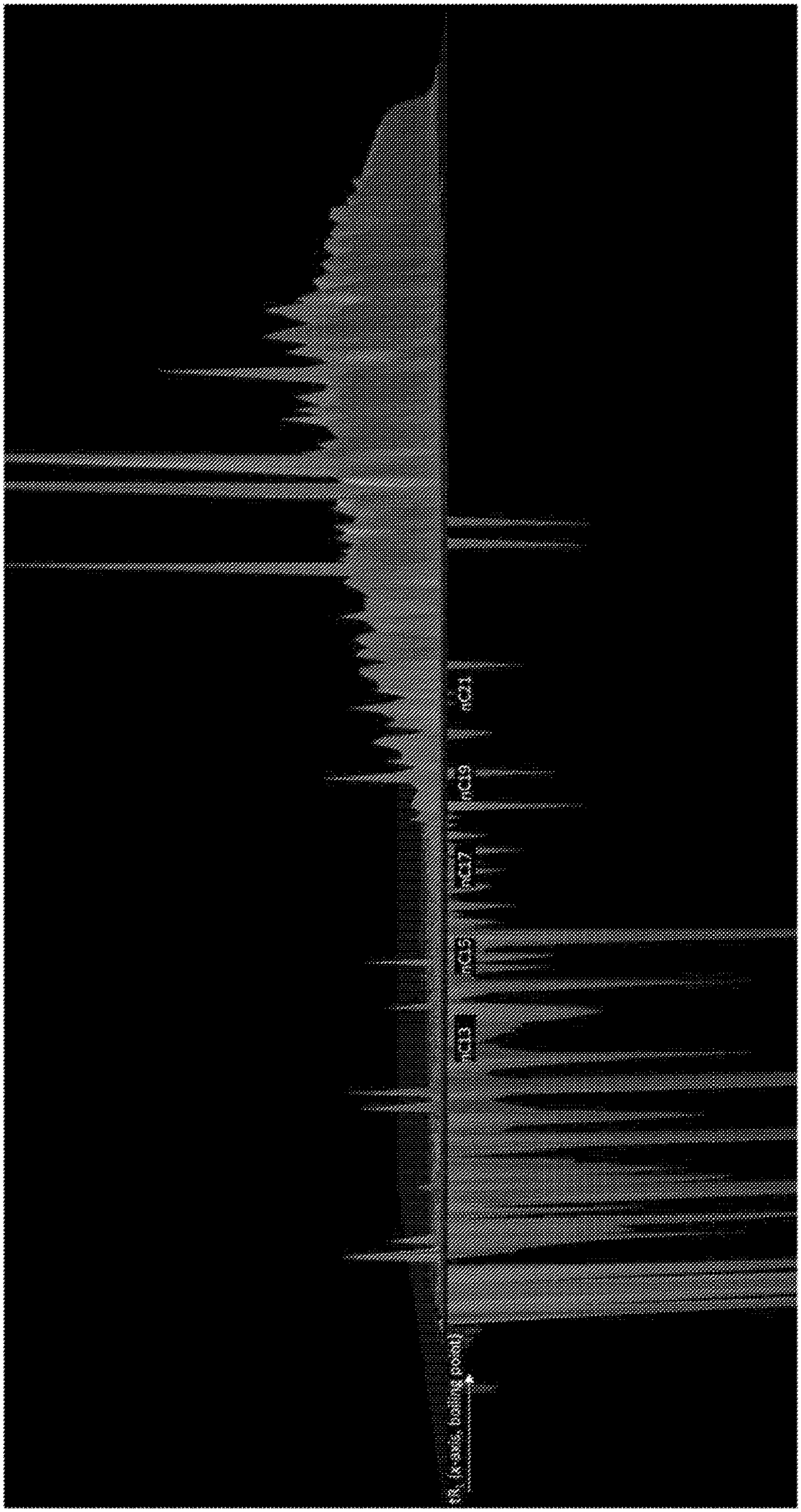

FIG. 16*a-c* show GC×GC difference plot showing molecules that are enhanced in the permeate (red) and molecules that are enhanced in the retentate (green) in Example 4.

EXAMPLE 1—SYNTHESIS OF MOMS

In the following example, MOMs comprising halogenated hydrocarbon oligomers were synthesised including a reaction step and a purification step.

1.1—MOM-2—Reaction Step

In brief, a 1H, 1H-Perfluoro-1-pentanol (1 equivalent) and carbonyldiimidazole (1.2 equivalents) were dissolved in dimethylformamide (DMF) in a flask with strong magnetic stirring. The reaction took place under nitrogen atmosphere and a specific temperature was applied by using an oil bath. After stirring for a certain period of time, pentaethylenehexamine was added to the mixture and the reaction was left for a certain reaction time, after which the colour of the resulting mixture changed from colourless to light yellow.

1.2—MOM-2—Purification Step

Precipitation: After cooling down to the room temperature, the mixture was slowly added to the excess amount of hexane and dichloromethane (DCM) mixture under strong magnetic stirring. The yellow precipitate was collected by separatory funnel and dissolved by DCM subsequently.

Extraction: A Semi-saturated saline was added to the solution and well mixed for a certain period. The supernatant was removed while the underlying layer was extracted again by saturated saline. The procedure was repeated several times to remove water soluble by-products. The remaining small amount of water was removed by sodium sulphate anhydrous and filtered by filter paper subsequently.

Concentration: The excess amount of solvent was removed by rotary evaporator and further dried under high vacuum at certain temperature.

Finally, the yellow gel-like product MOM-2, with chemical structure shown in Scheme 1, was obtained with ~30-35% yield, and stored in 4° C. environment.

Scheme 1. Chemical structure of MOM-2 comprising halogenated hydrocarbon oligomers

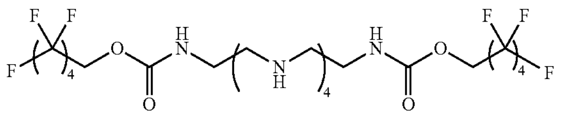

1.3—MOM-1, MOM-3, and MOM-4

The synthetic procedure outlined in Examples 1.1 and 1.2 was adapted to prepare MOM-1, MOM-3 and MOM-4:

MOM-1

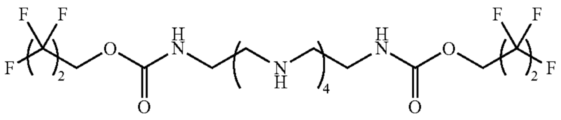

MOM-3

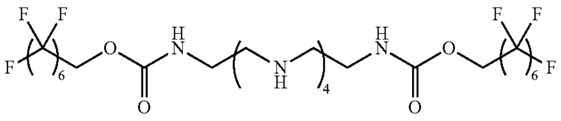

MOM-4

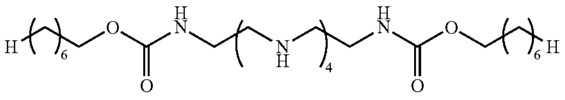

EXAMPLE 2—PREPARATION OF TFC MEMBRANE

In the following example, membranes of the present invention are formed through interfacial polymerisation to form a polyamide separating layer on a polyacrylonitrile support membrane.

2.1—Formation of Polyacrylonitrile Support Membrane

Polyacrylonitrile membranes were cast using a continuous casting machine (Sepratek, South Korea). The dope solution was prepared by dissolving 11 wt % polyacrylonitrile powder in a mixture of 44.5 wt. % DMSO and 44.5 wt. % 1,3-dioxolane, and stirred overnight at 75° C. Prior to casting, the dope solution was filtered through 41 μm filter (NY4104700, Merck), and subsequently through 11 μm filter (NY1104700, Merck) using a nitrogen pressurised filtration cell (XX4004740, Merck) at pressures of up to 70 psi. The membrane was cast on to a PET non-woven fabric (Hirose RO grade). The gap between the casting knife and the backing was set at 120 μm. The casting speed was controlled by the winder tension. After casting on the backing, the dope/non-woven composite underwent phase inversion through tangential entry into the water bath. After casting, the support was immediately immersed in water at 60° C. for 3 h, followed by drying at room temperature.

2.2—Formation of TFC Membranes by Interfacial Polymerisation

TFC membranes in this Example were labelled TFC-x-MOM-n, where x represents the specific interfacial polymerisation conditions employed for each membrane, and n represents the oligomeric MOM moiety employed.

The separating polyamide layer was made through interfacial polymerization at a free liquid-liquid interface. A given MOM synthesized in Example 1 was dissolved in an aqueous solution, preferentially more than 25 ml, with THF as an additive bi-solvent. TFC-1 used a ratio of 0.02 wt. % MOM: 5 wt. % THF: 94.98 wt. % water. TFC-2 used a ratio of 0.05 wt. % MOM: 5 wt. % THF: 94.95 wt. % water. TFC-3 used a ratio of 0.025 wt. % MOM: 5 wt. % THF: 94.975 wt. % water. These solutions were added into MOM dropwise applying ultrasonication. The solution comprising MOM was added into a glassware container where an inert substrate was immersed in. An organic solution containing 0.1 wt. % trimesoyl chloride (TMC, 98%, Sigma-Aldrich) was poured into the container carefully and left to be in contact with aqueous solution. After 7 min reaction, the immersed substrate was lifted to pick up the polyamide film formed at the free liquid-liquid interface, and subsequently re-floated the film on a bulk water surface, followed by fishing and adhering the film on a polyacrylonitrile support for an incorporation of thin film composite (TFC) membrane. TFC membrane was rest to be dried in room conditions. The chemical structures of the monomers used for the interfacial polymerization reaction are shown in Scheme 2.

Scheme 2. Exemplary monomers involved in the interfacial polymerisation.

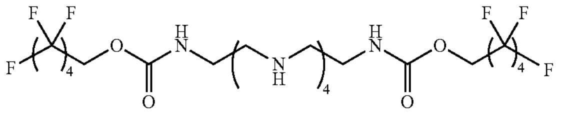

MOM-2

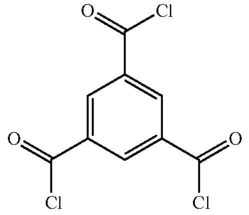

TMC

EXAMPLE 3—TFC MEMBRANE PERFORMANCE

The nanofiltration separation properties, in terms of permeance profiles and molecular weight cut off (MWCO) curves, of the TFC membranes of Example 2 was evaluated.

3.1—Testing Protocols

Nanofiltration experiments involving dye separations were carried out under 10 bar at 25° C. in a dead-end cell, and nanofiltration experiments involving polystyrene separations were carried out at 10 bar at 25° C. using a cross-flow filtration system.

For each filtration experiment in dead-end cell, one membrane disc, of active area 12.6 $cm^2$, was cut out from flat sheets and placed into the cell, and at least three membranes made from identical conditions were used to demonstrate the reproducibility. Solvents were contacted with the membrane in the order water, methanol, acetonitrile, hexane, heptane, and toluene. Permeate samples for permeance measurements were collected at intervals of 10 min, and samples for rejection evaluations were taken after steady permeance was achieved. The MWCO was then determined by interpolating from the plot of rejection against molecular weight of dye compounds. Each rejection test comprised one dye solute with a constant concentration of 20 $mg \cdot L^{-1}$ in methanol. Analysis of dye concentrations was done using an UV-vis detector in the wavelength ranging from 200 to 800 nm.

For crossflow filtration, the membrane discs, of active area 13.8 $cm^2$, were cut out from flat sheets and placed into 4 cross flow cells in series. Solvent was heptane. Permeate samples for permeance measurements were collected at intervals of 1 h, and samples for rejection evaluations were taken after steady permeate flux was achieved. The MWCO was determined by interpolating from the plot of rejection against molecular weight of marker compounds. The solute rejection test was carried out using a standard feed solution comprised of a homologous series of styrene oligomers (PS) dissolved in heptane. The styrene oligomer mixture contained 1-2 g $L^{-1}$ each of PS 580 and PS 1090 (Polymer Labs, UK), and 0.01 g $L^{-1}$ of α-methylstyrene dimer (Sigma-Aldrich, UK). Analysis of the styrene oligomers was done using an Agilent HPLC system with UV/Vis detector set at a wavelength of 264 nm. Separation was achieved using a reverse phase column (C18-300, 250×4.6 mm). The mobile phase consisted of 35 vol % analytical grade water and 65 vol % tetrahydrofuran with 0.1 vol % trifluoroacetic acid.

Solvent permeance (J) was determined by measuring permeate volume (V) per unit area (A) per unit time (t) per unit transmembrane pressure (ΔP) according to the following equation:

$$J = \frac{V}{A \cdot t \cdot \Delta P} \tag{1}$$

The rejection (R) of markers was calculated from equation 2, where $C_p$ and $C_f$ correspond to solute concentrations in the permeate and the feed respectively.

$$R = \left(1 - \frac{C_p}{C_f}\right) \times 100\% \tag{2}$$

3.2—Results

Figure 1:
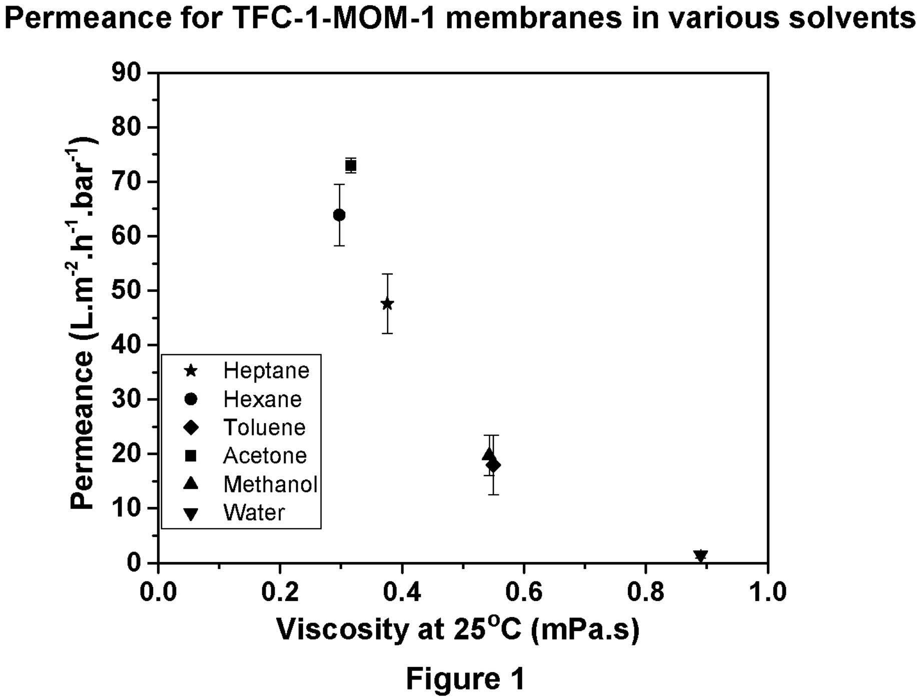
Figure 2:
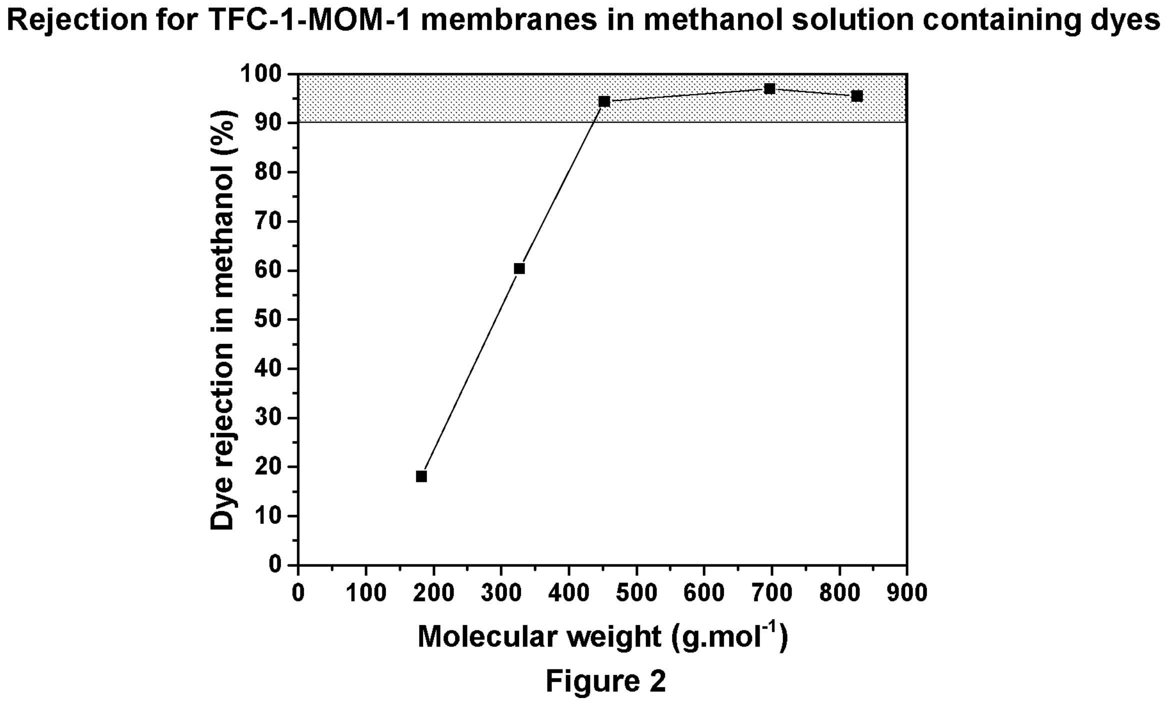
Figure 3:
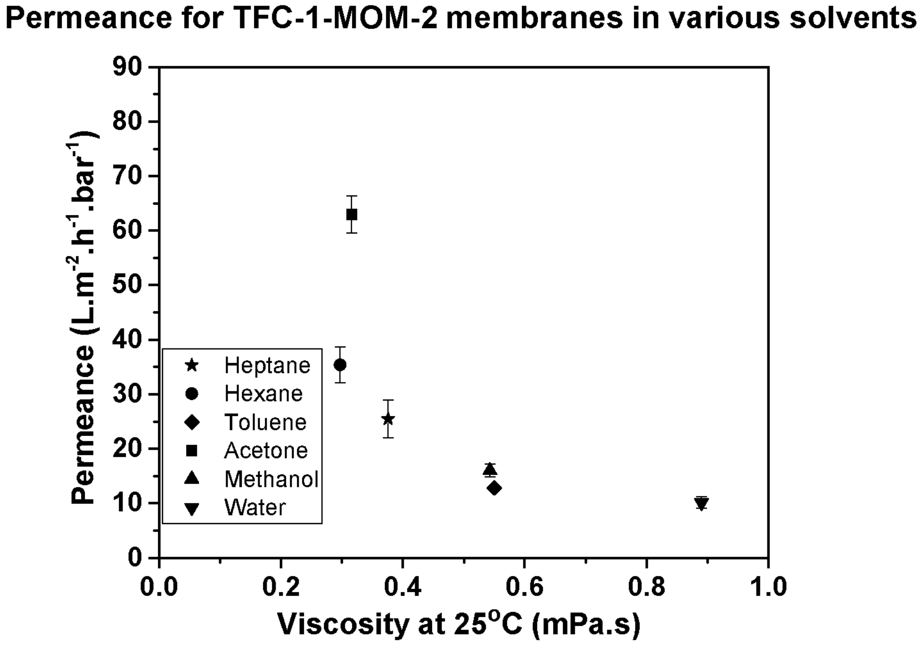
Figure 4:
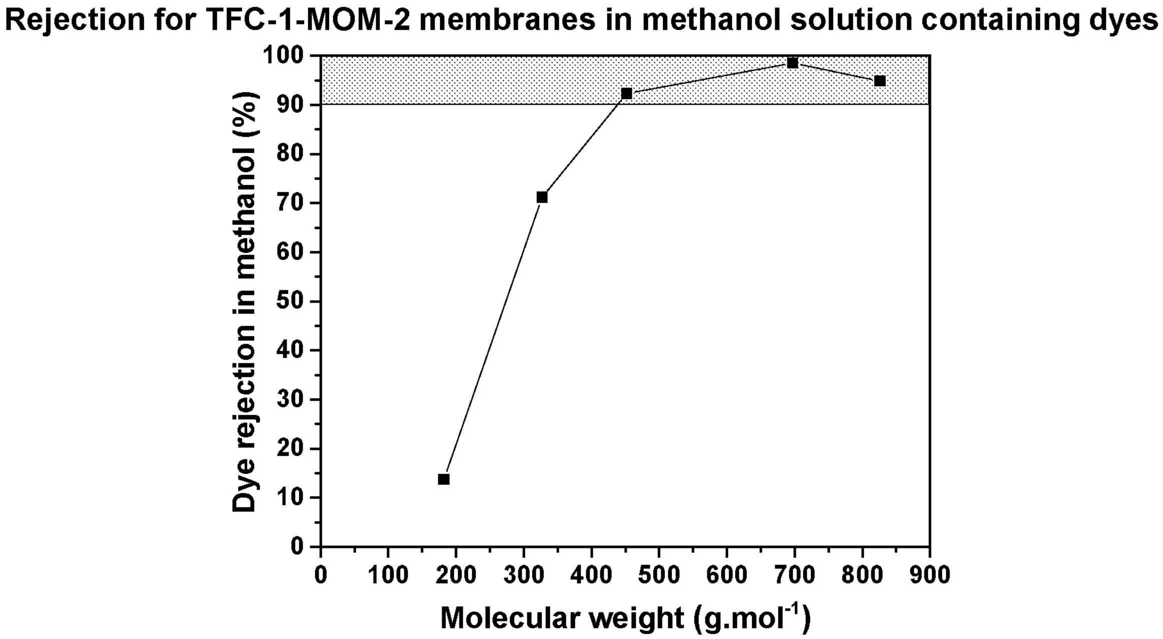
Figure 5:
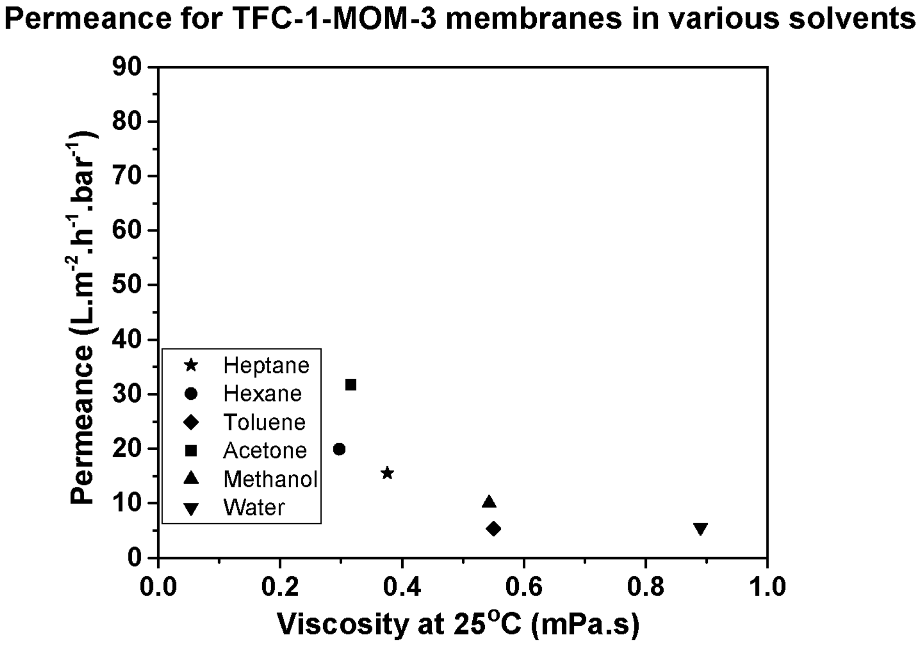
Figure 6:
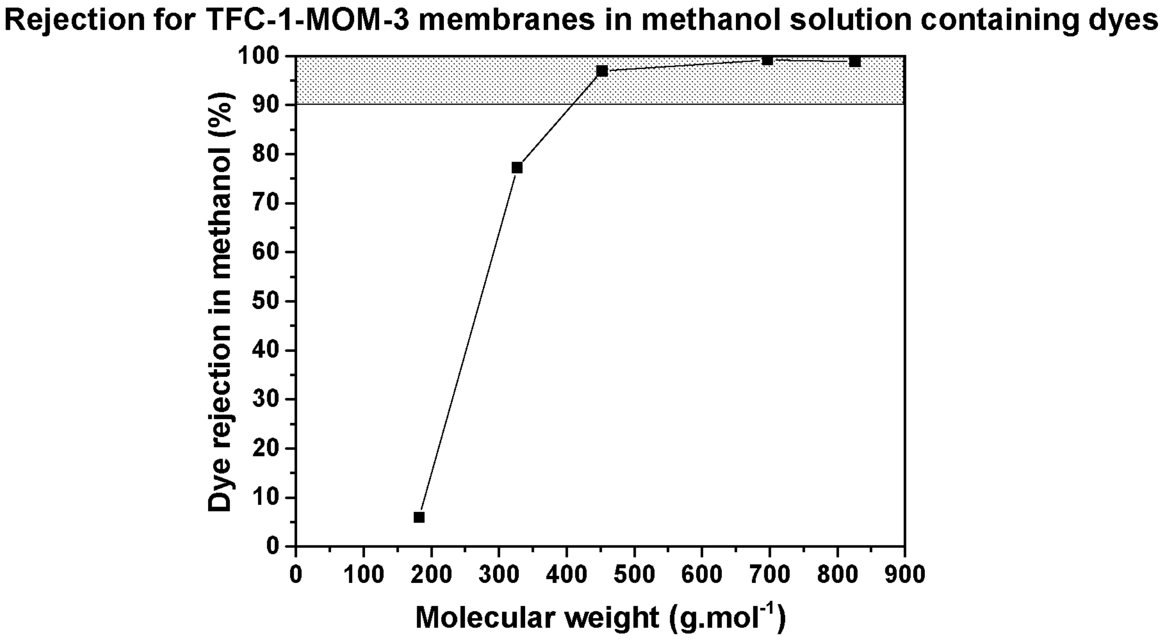
Figure 7:
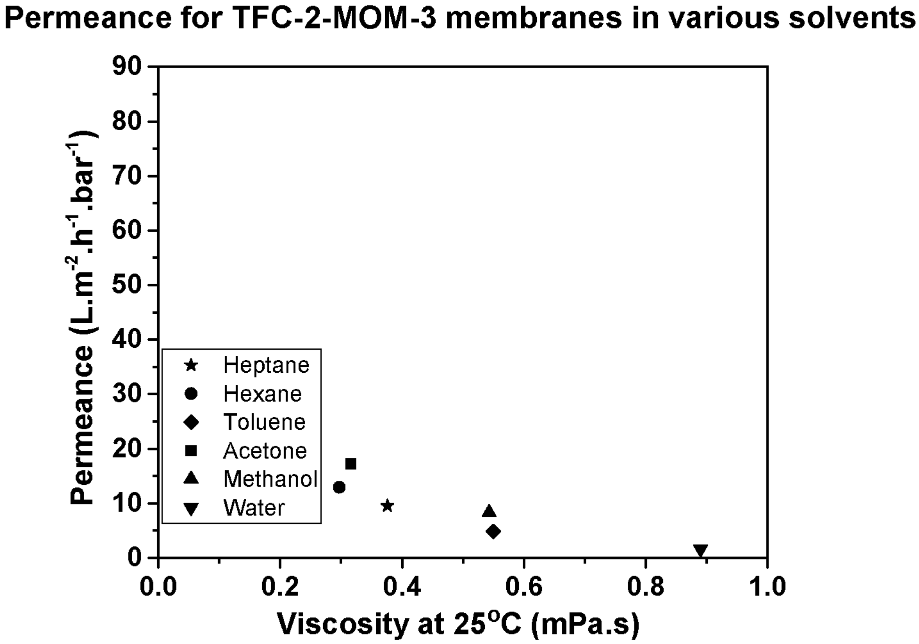
Figure 8:
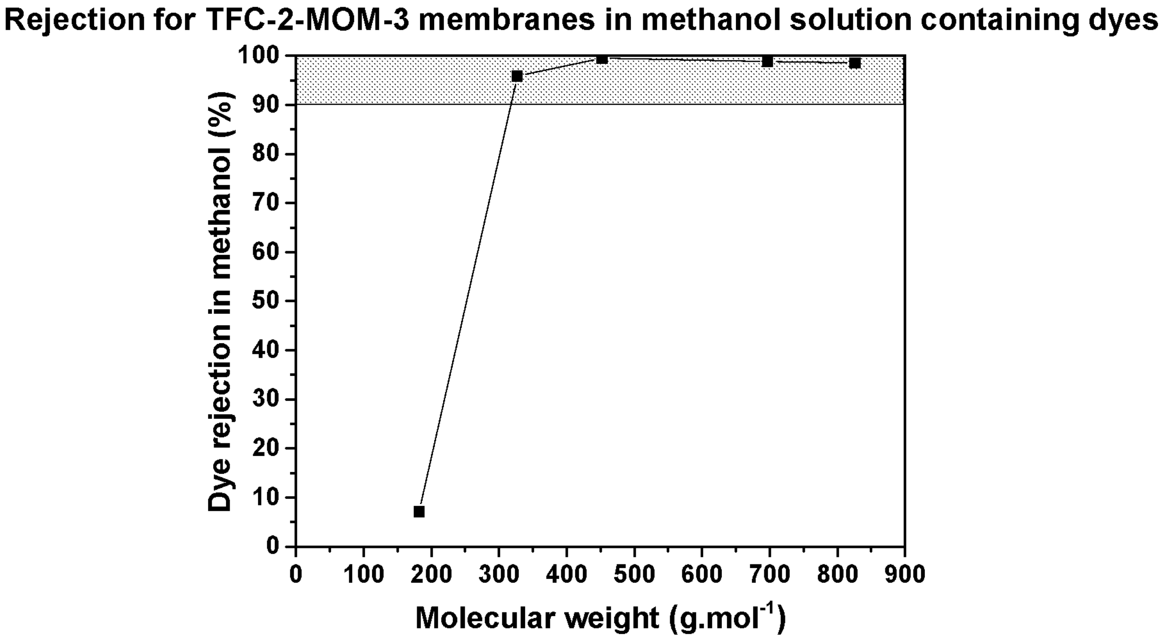
Figure 9:
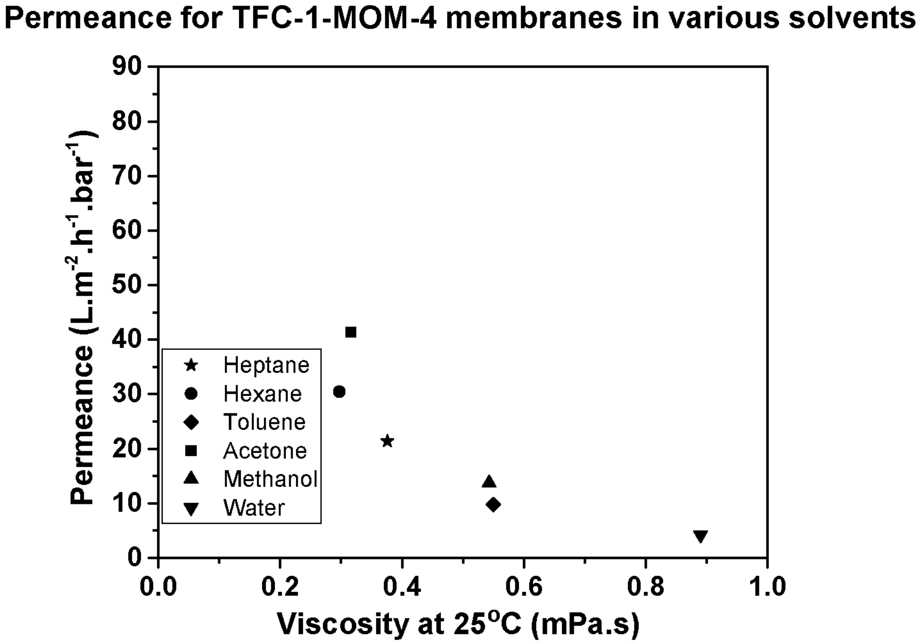
Figure 10:
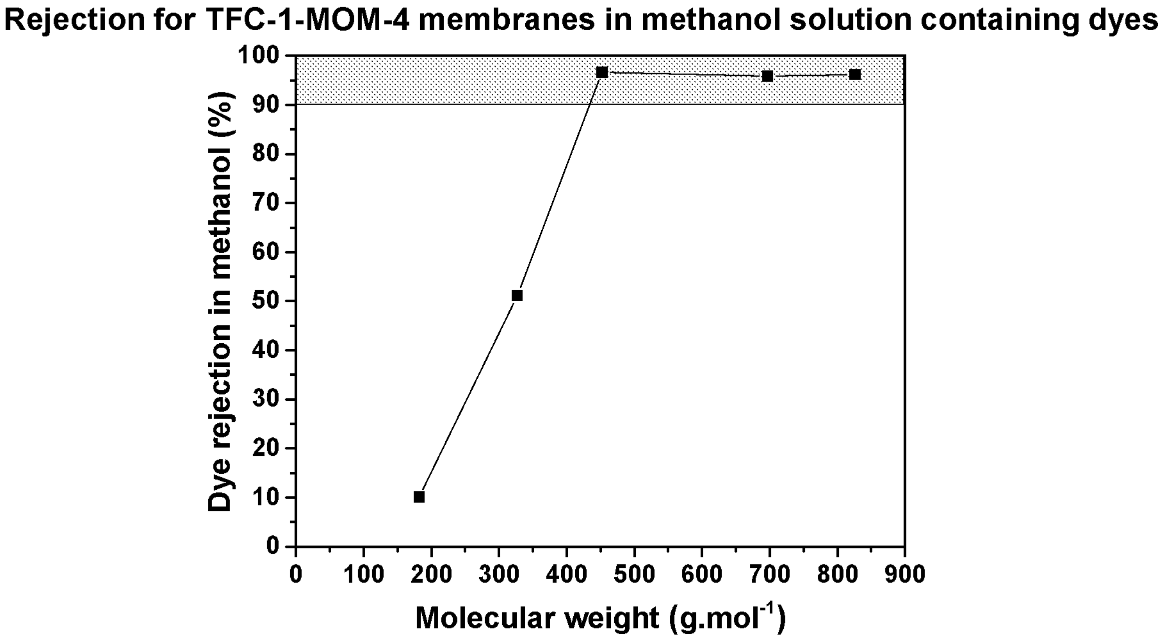
Figure 11:
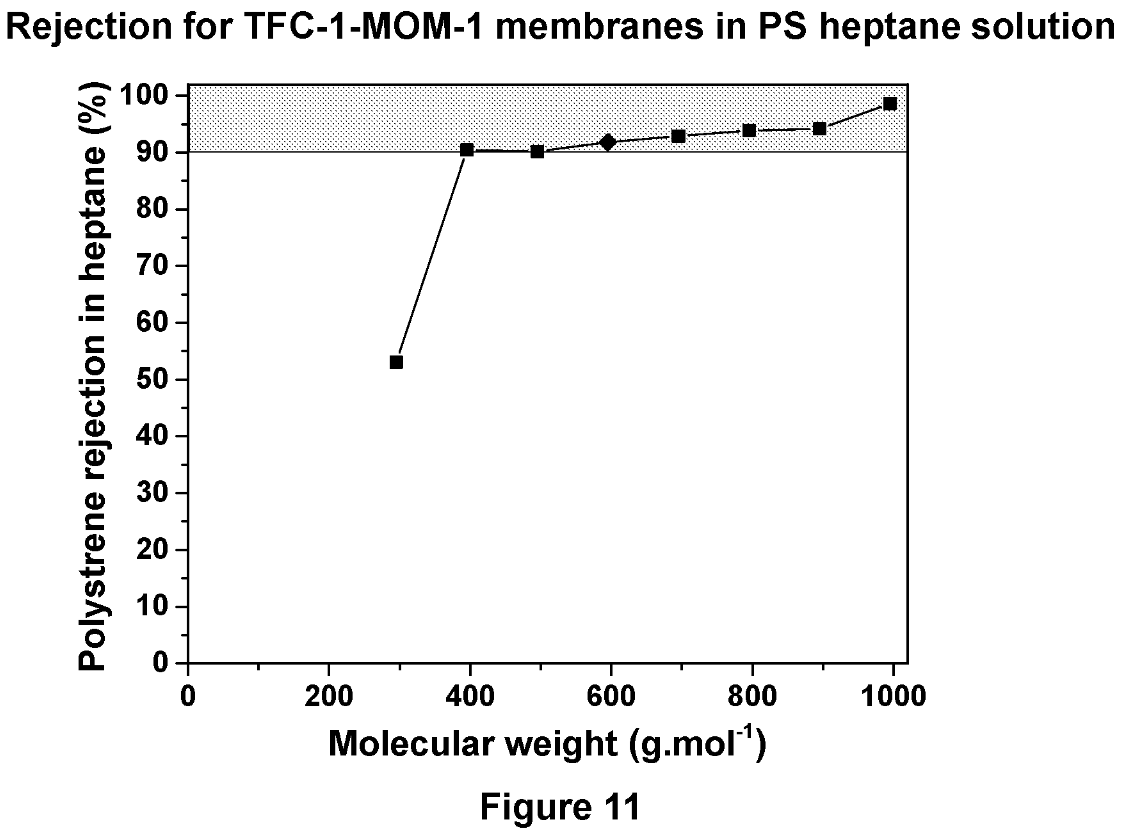
Figure 12:
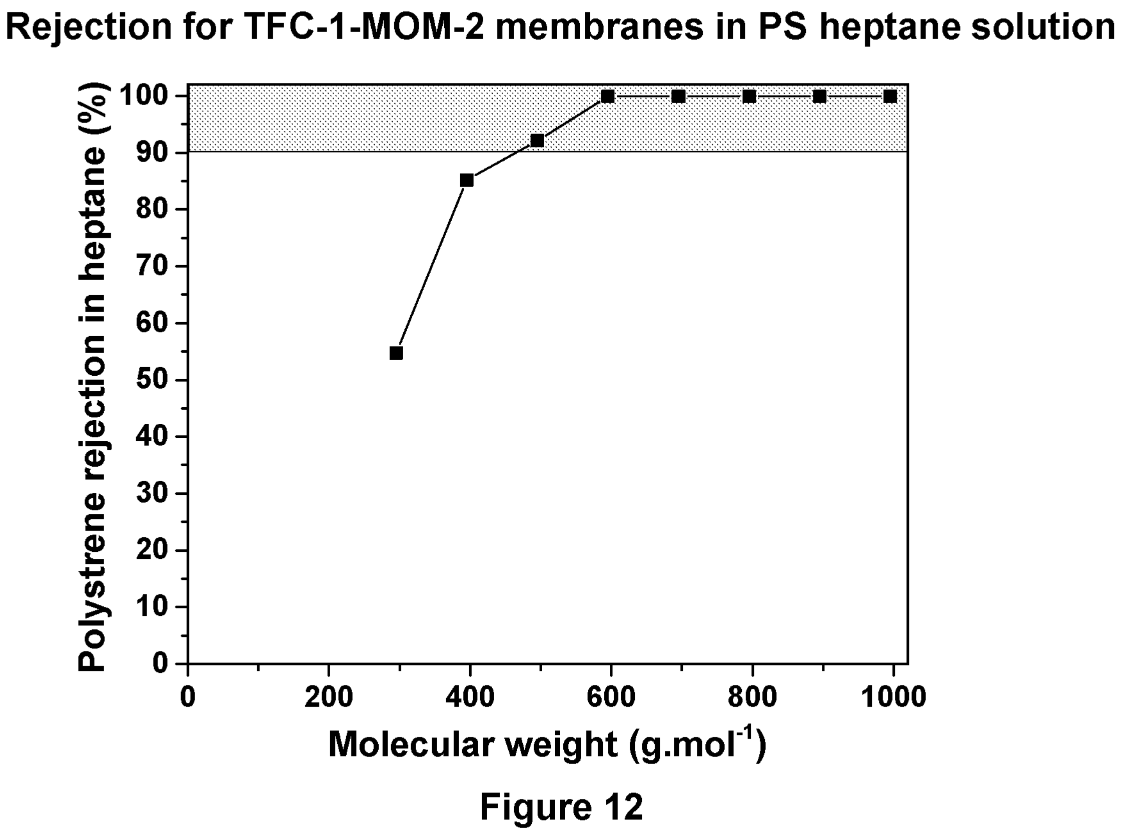
Figure 13A:
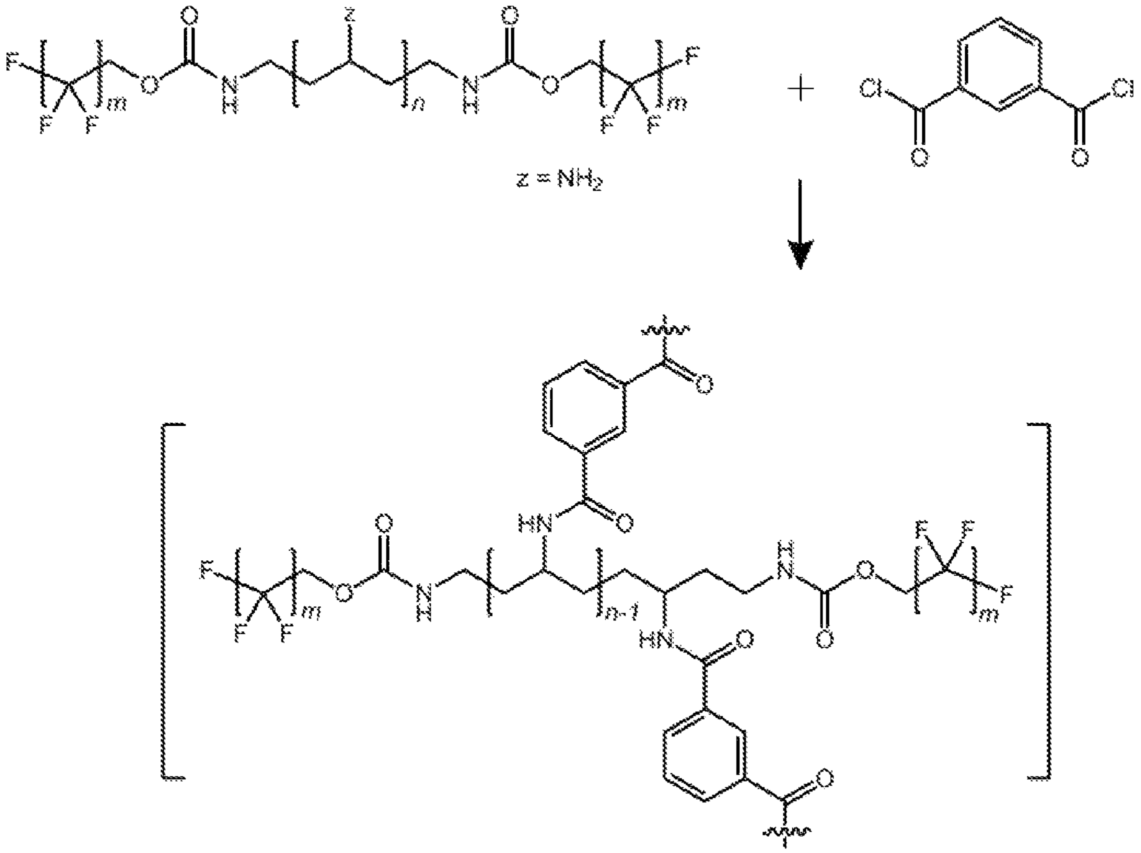
Figure 13B:
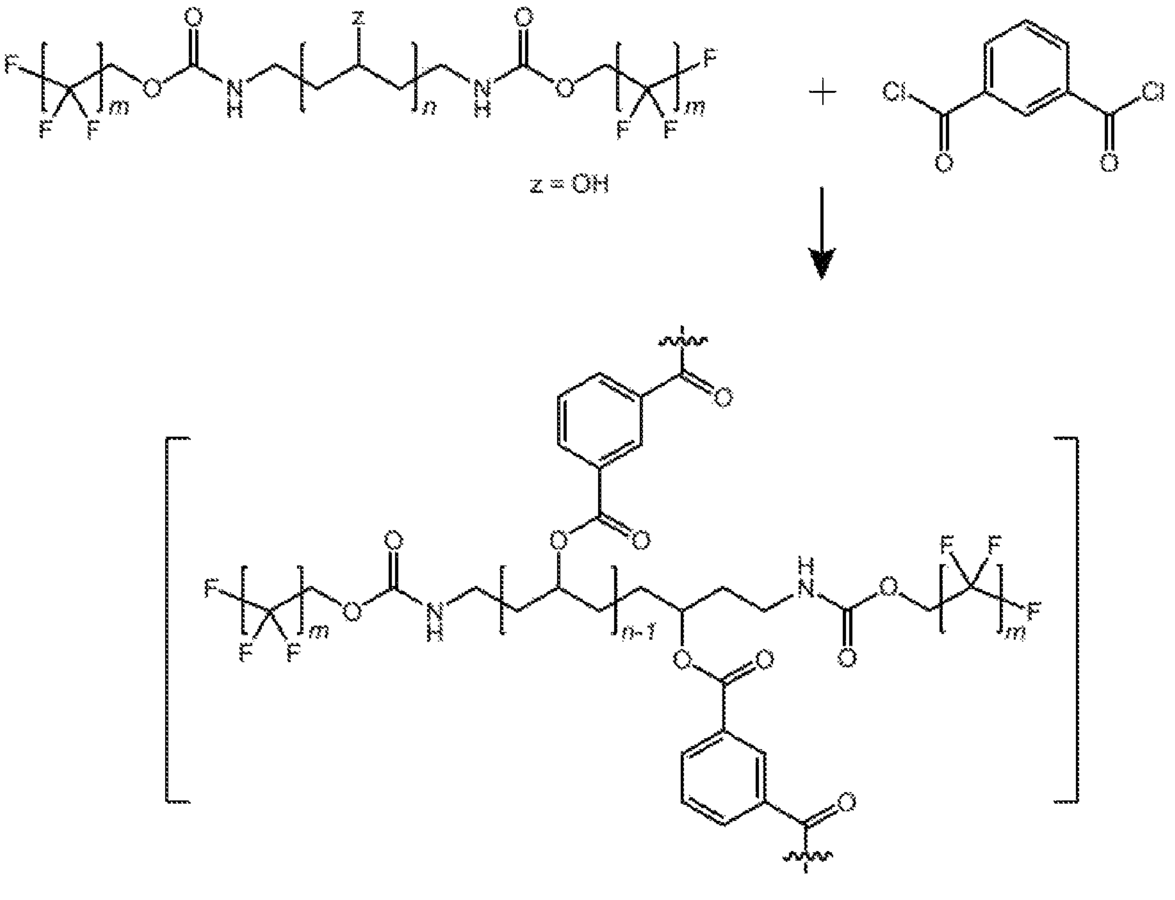
Figure 13C:
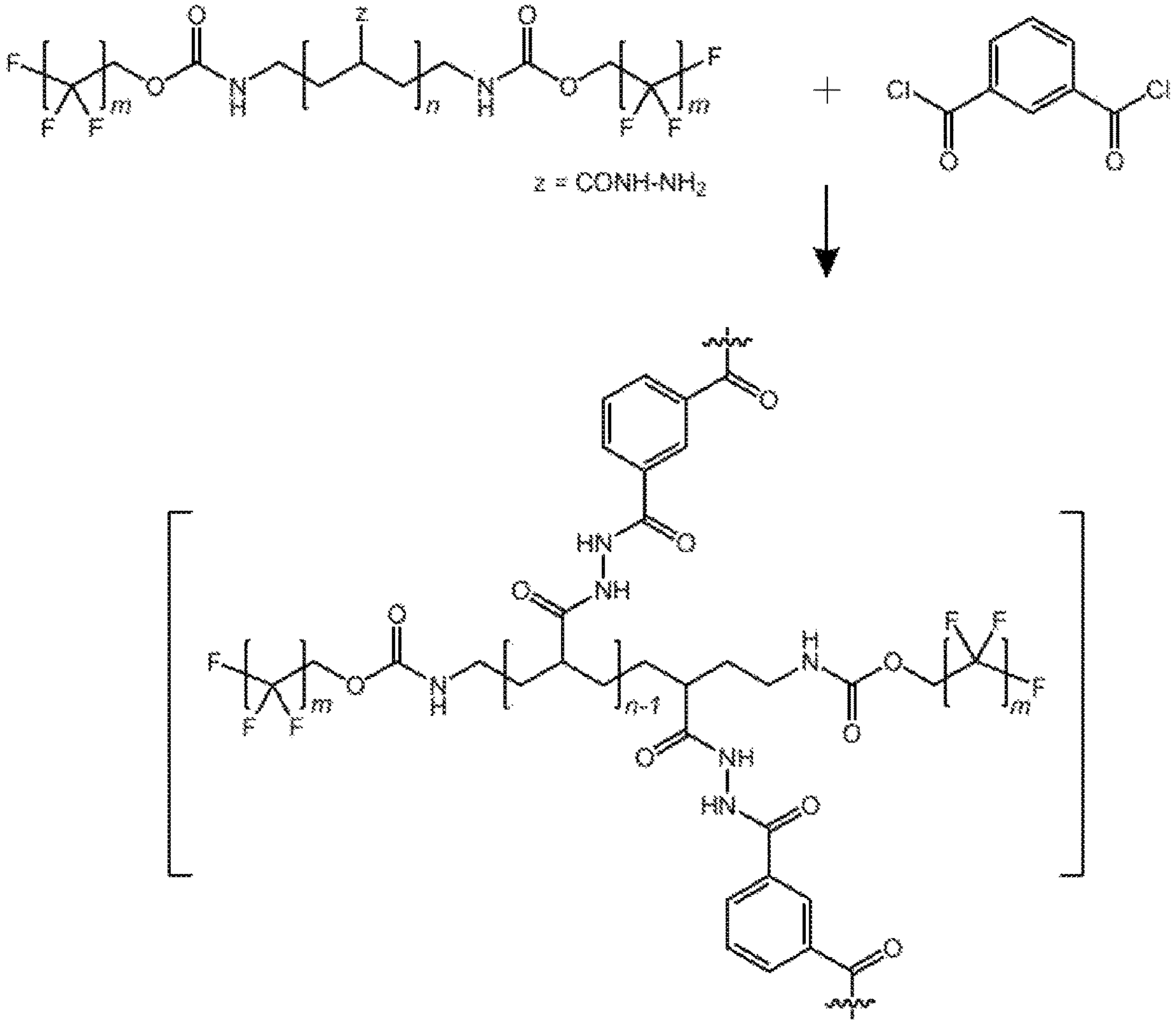
Figure 13D:
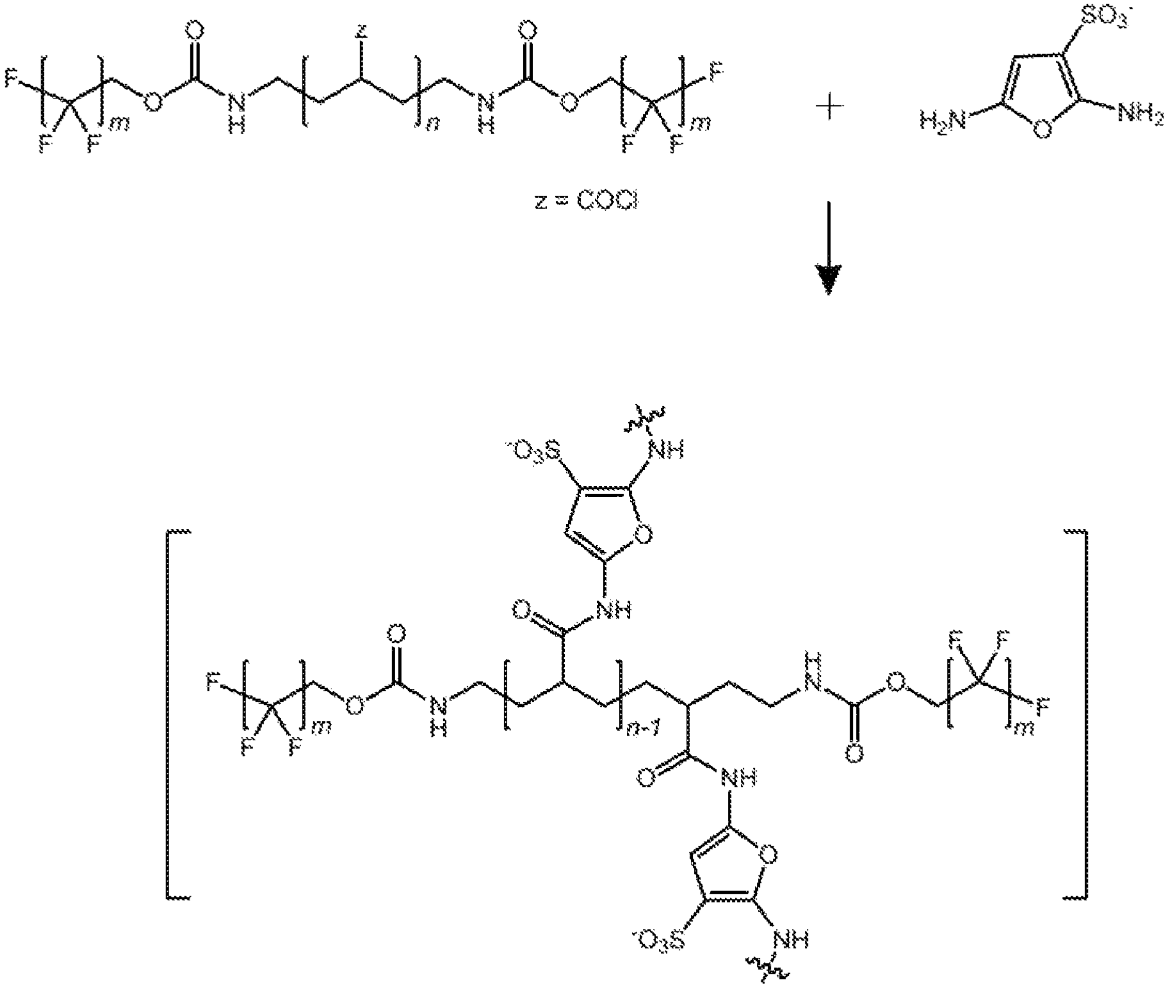
Figure 13E:
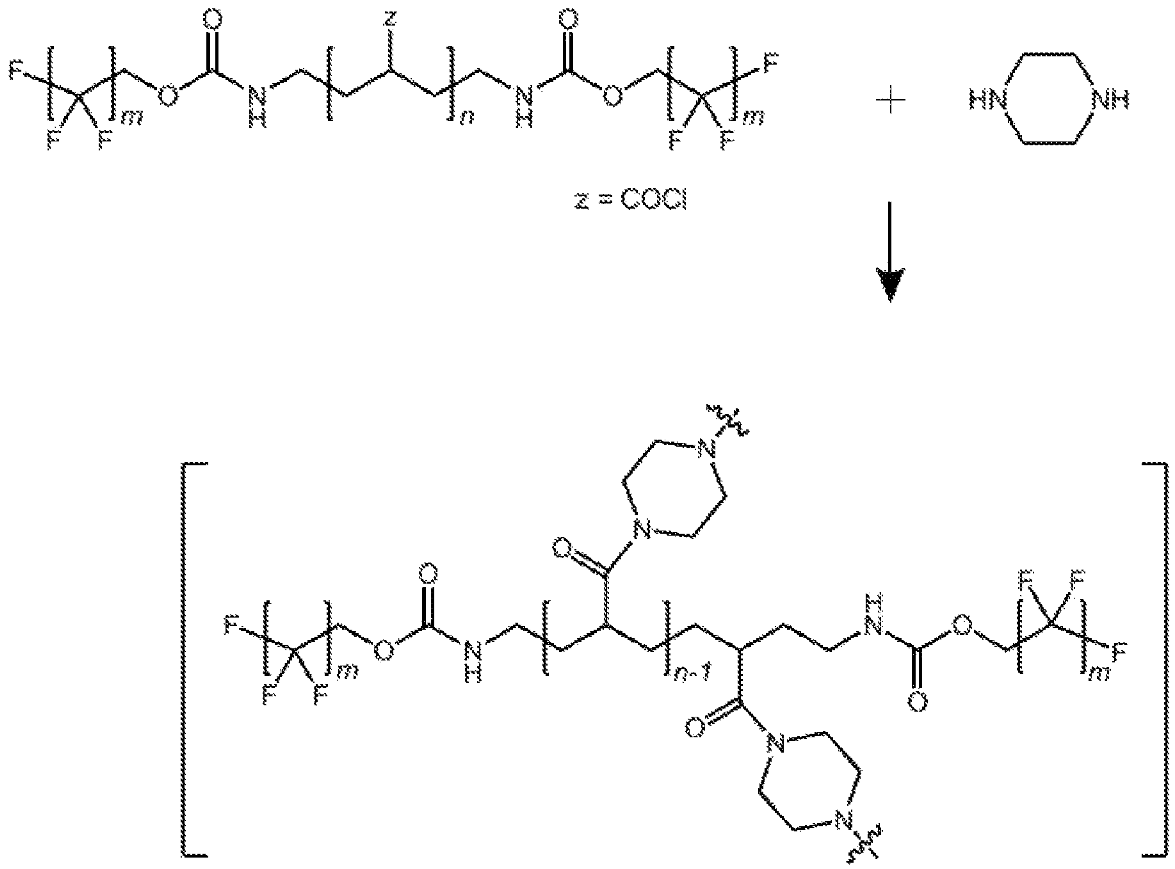
Figure 13F:
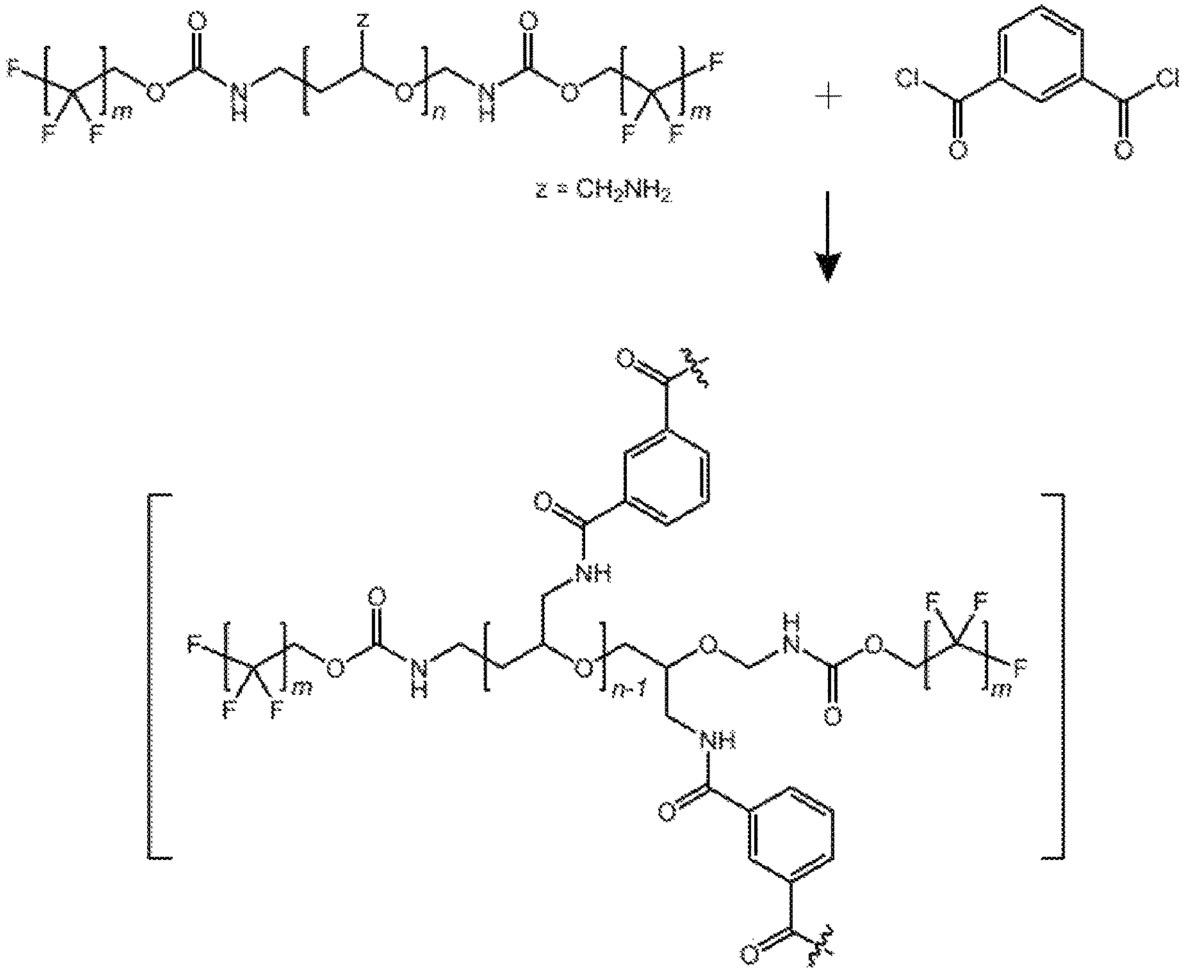
Figure 13G:
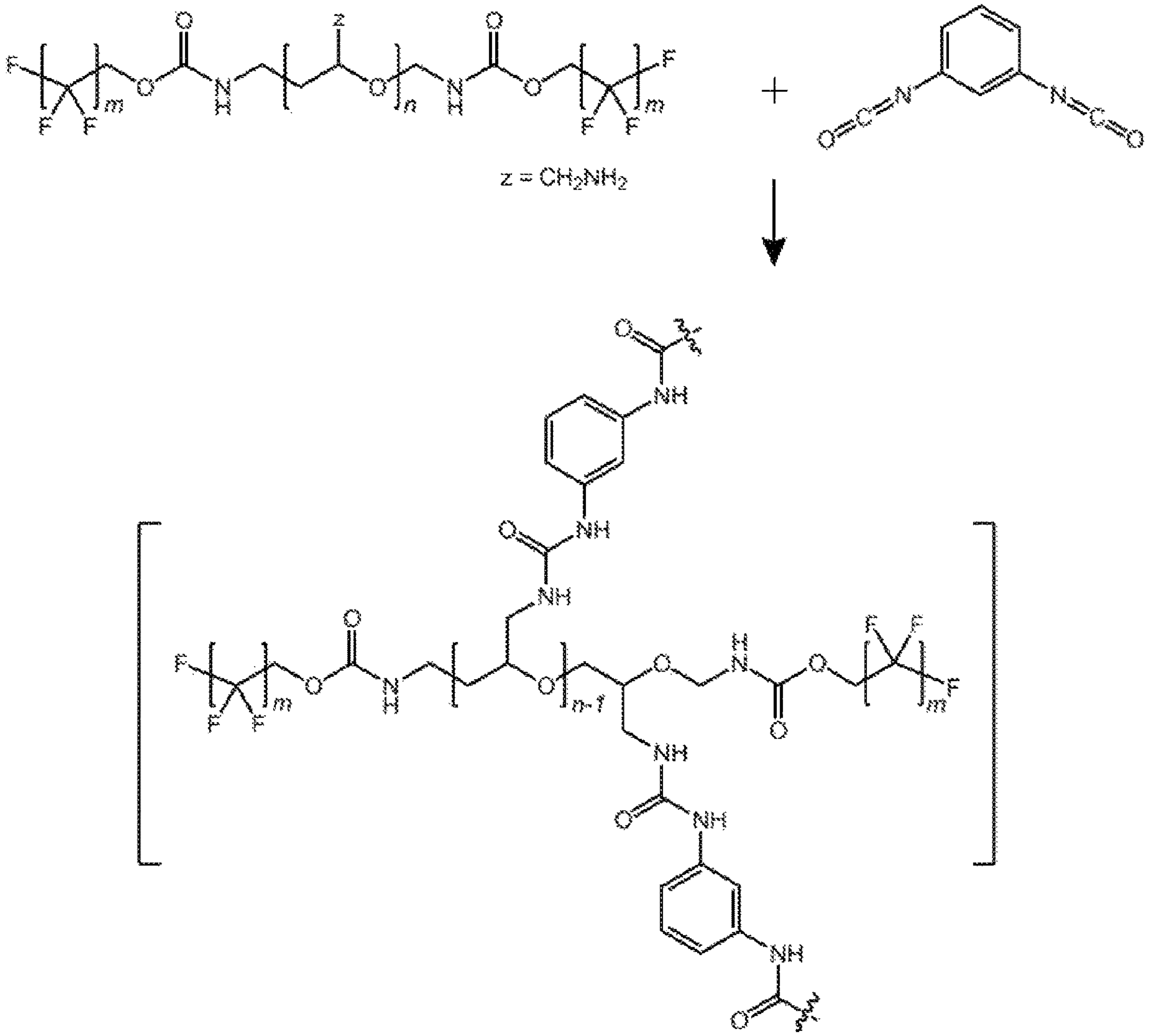
Figure 13H:
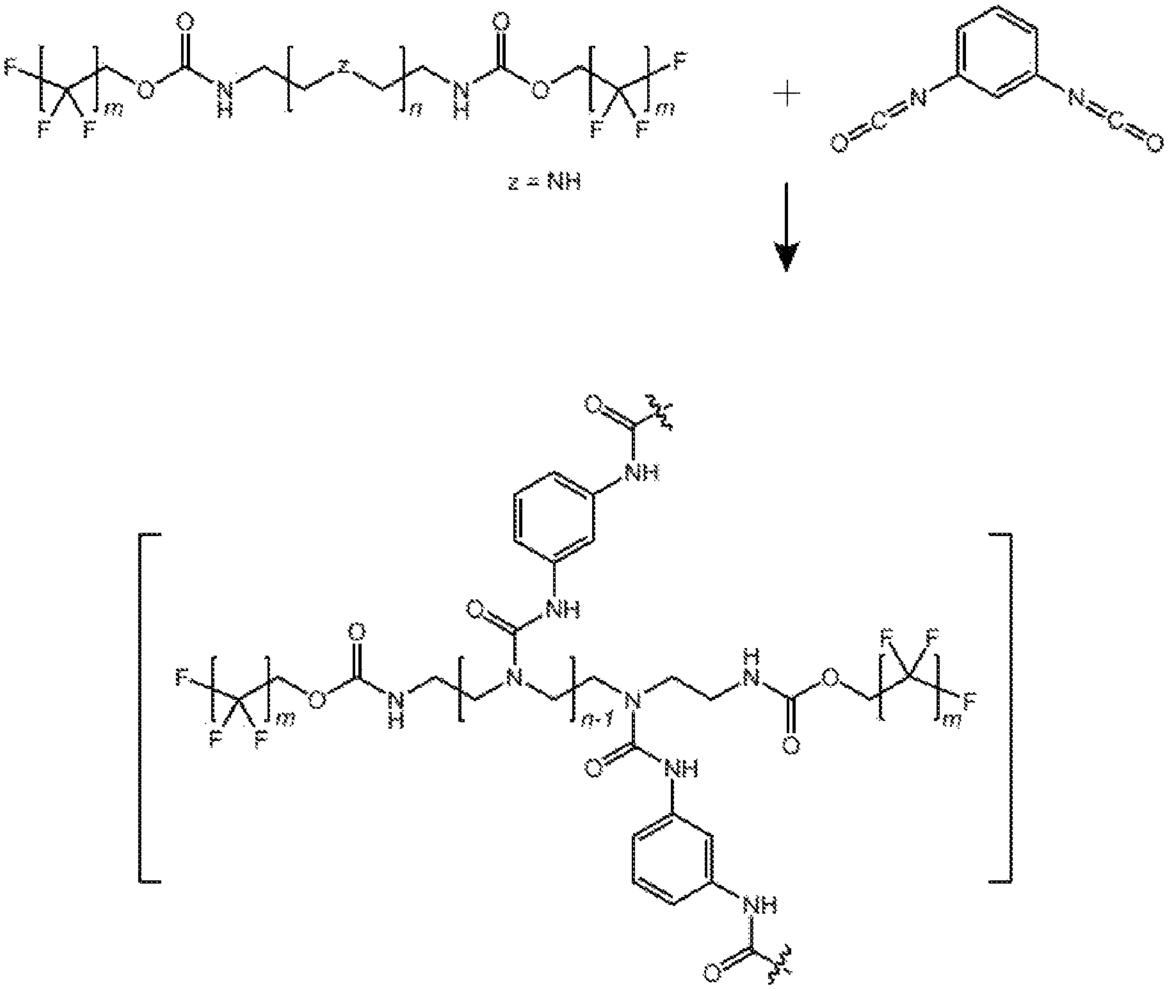
Figure 13I:
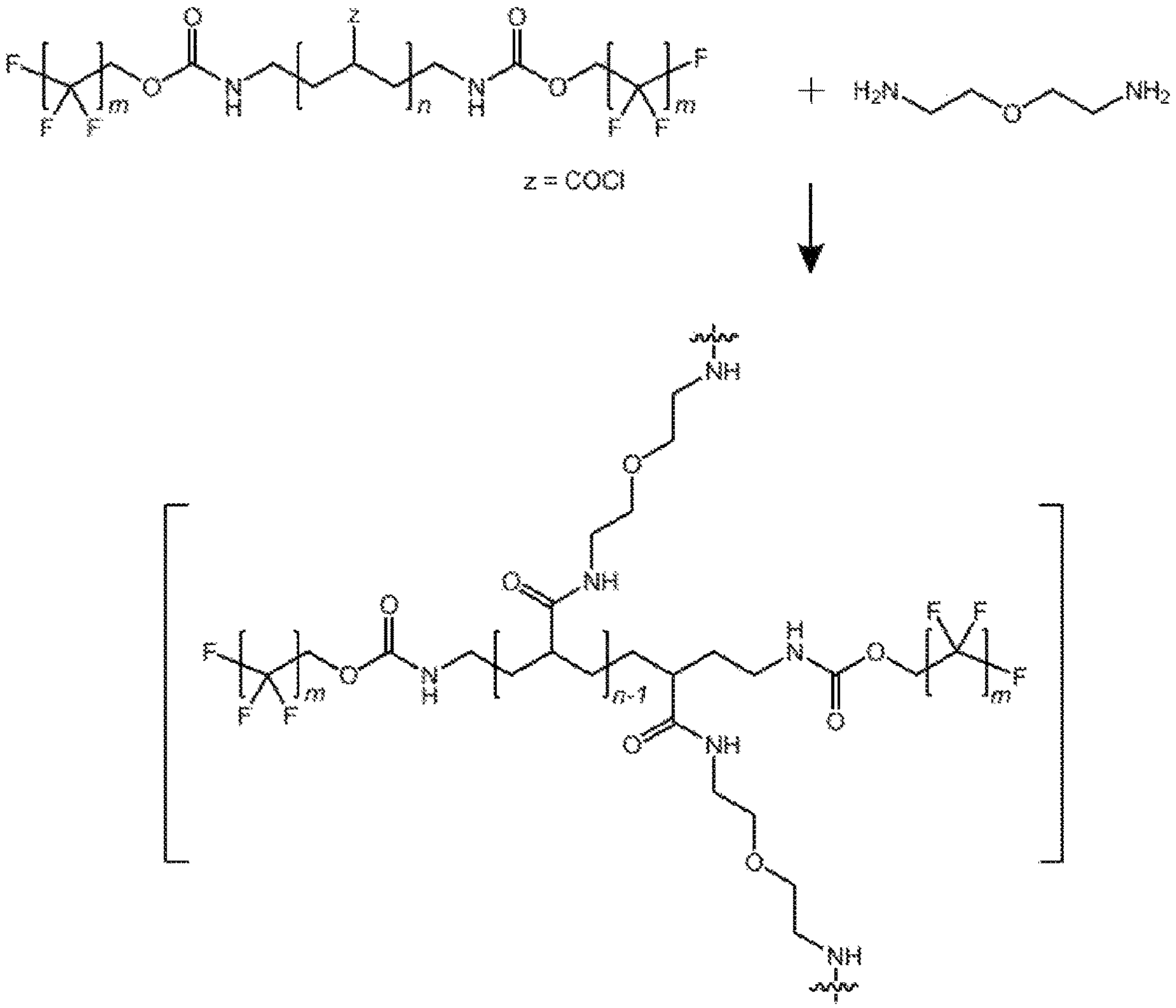
Figure 13J:
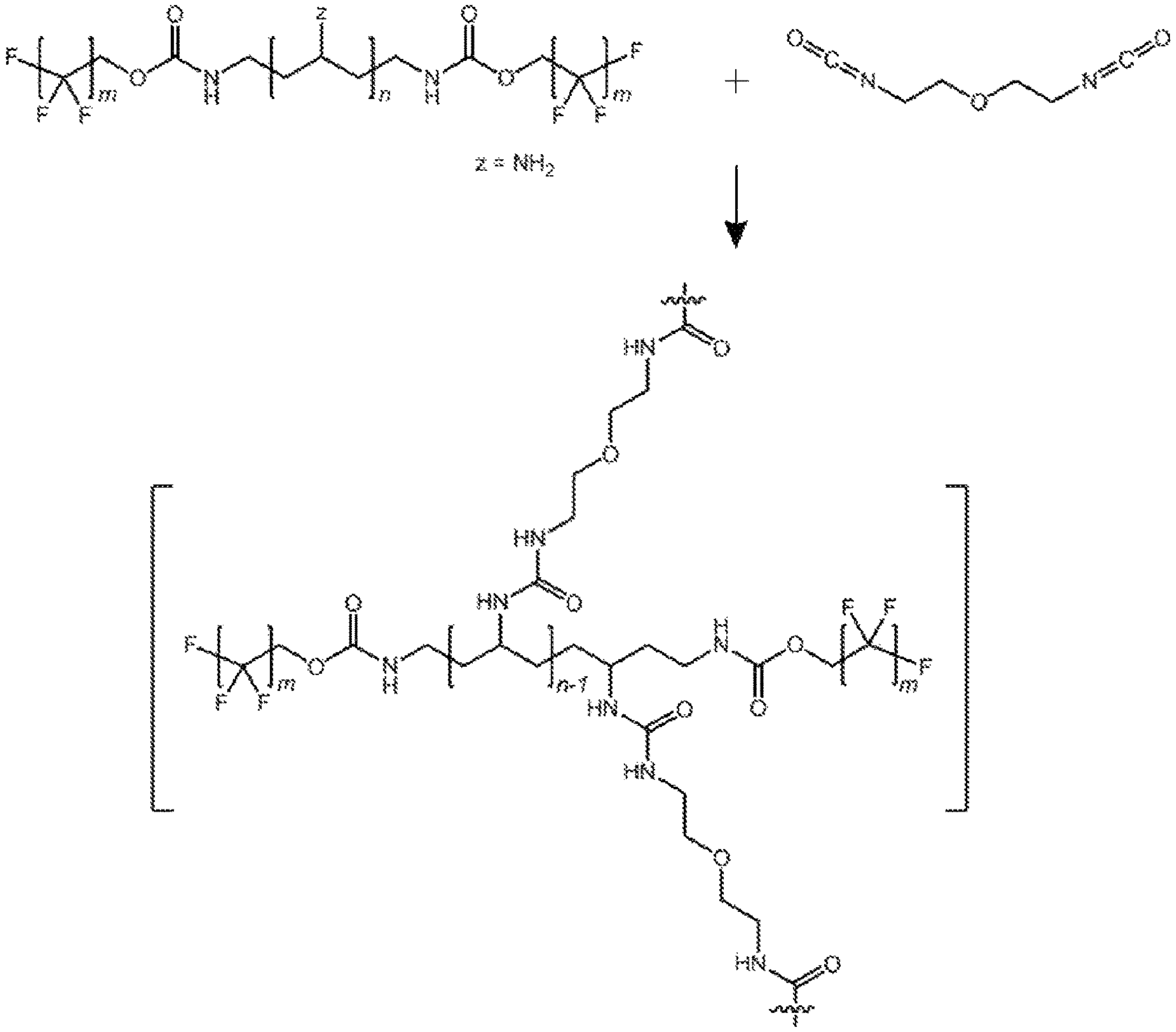
Figure 13K:
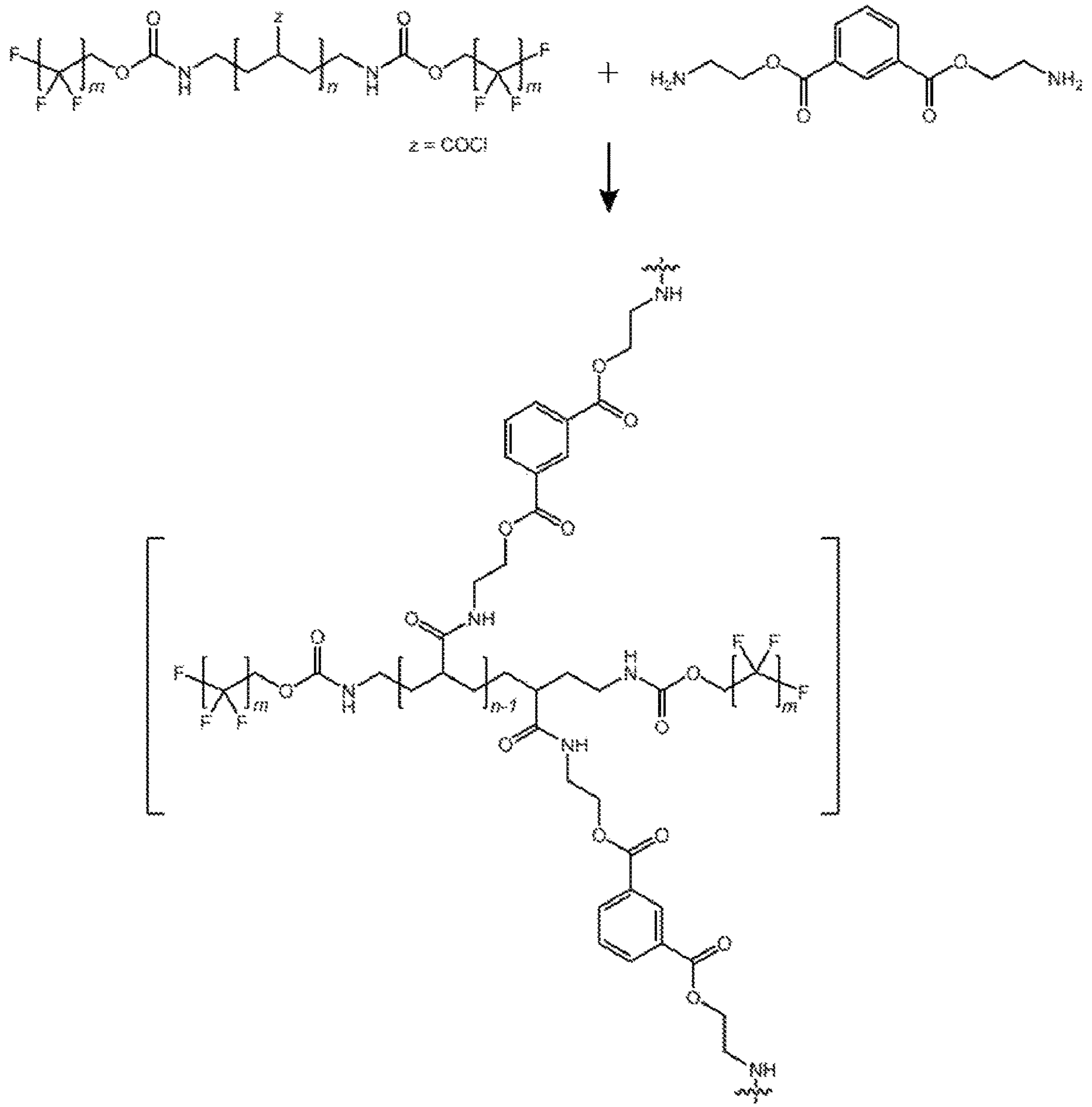

The performance of TFC membranes was evaluated in the dead end cell by filtering solvents in the order water, methanol, acetonitrile, hexane, heptane, and toluene. The rejection curves and permeances for the TFC membranes made from different types (n) of MOM were shown in FIG. 1-10 for the separation of dye solutes in methanol, after passing pure solvents through the membrane in the order given above. The rejection curves for the TFC-x-MOM-n membranes are shown in FIG. 11-12 for the separation of polystyrene (PS) solutes in heptane. It is clearly shown that the performance of TFC membranes changed with the type of MOM used for interfacial polymerisation.

EXAMPLE 4—CRUDE OIL SEPARATION BY TFC MEMBRANE 4.1—Testing Protocol

Separation of a light shale-based crude oil was carried out in a Sterlitech HP4750X dead-end cell. A coupon of TFC-3-MOM-3 membrane with active area of 14.8 $cm^2$ was cut out from flat sheets and placed into the cell. Initially, 200 ml each of water, acetone and toluene (in that order) were filtered through the membrane at room temperature and 10 bar. Following this "activation" procedure, the cell was charged with 100 g of a light shale-based crude oil. Using nitrogen head pressure, the crude oil feed was pressurized to 43 bar and maintained at room temperature (22° C.). The cell was stirred at a constant rate of 400 rpm. The weight of permeate (converted to volume (V)) was measured as a function of time (t) and using the membrane active area (A) and transmembrane pressure (ΔP), the average membrane permeance (J) was calculated according to equation (1) in Example 3.

The permeate, feed and retentate samples were analysed using a standardized simulated distillation technique to determine their boiling point distributions and a standard two-dimensional gas chromatography technique to visualize separation based on class and molecular weight.

4.2—Results

Figure 14:
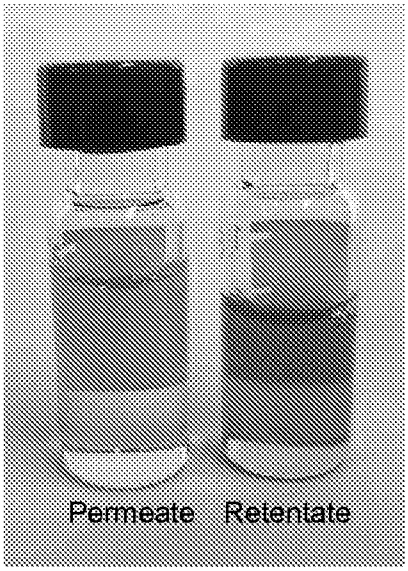
FIG. 14 shows the visual difference between permeate and retentate in Example 4.

The permeate was collected until a stage cut of 15% was obtained. The membrane flux remained relatively constant throughout the run at 3.6 $L/m^2/h$. The permeance calculated from equation (1) was 0.083 $L/m^2/h/bar$, which is much higher than many commercial RO/NF membranes. From FIG. 14, a visual difference between permeate and retentate is observed, with the permeate appearing lighter (closer to naphtha/kero/jet range) than the retentate. This is further supported by the dynamic viscosity of the permeate at 30° C. (1.2 mPa·s) being less than half that of the retentate (2.5 mPa·s). The specific gravity of the permeate is also lower than that of the retentate—0.78 vs 0.80 at 30° C. These measurements indicate that the membrane selectively permeates lighter, higher value molecules while rejecting the heavier fractions.

Figure 15:
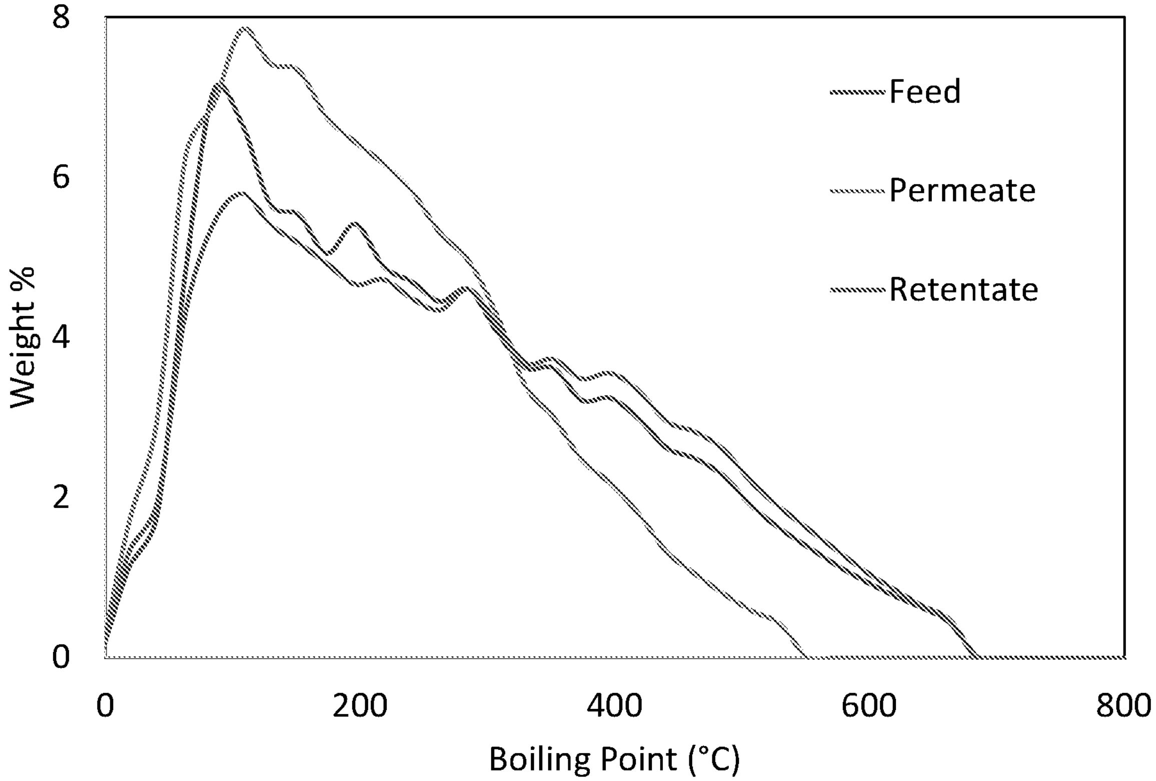
FIG. 15 shows a simulated distillation of feed, permeate and retentate samples in Example 4.

FIG. 15 shows the simulated distillation of the crude feed, permeate and retentate, which represents the boiling point distribution of each of the samples. The permeate has a cut-off at 550° C. while the feed and retentate boiling point range extends to 700° C. This demonstrates that the membrane rejects the heavy (residue) fraction. At the same time, there is enhancement of the light fractions including naptha/kero/jet fuel. FIG. 15 shows that 48 wt % of the feed has boiling point lower than 400° C. vs 60 wt % of the permeate has boiling point below 400° C., demonstrating that the light fractions become concentrated in the permeate and the heavy fractions in the retentate.

FIG. 16*a* shows the GC×GC difference plot for the permeate and retentate samples. Peaks that have higher intensity (and hence concentration) in the permeate appear green while those that have higher concentration in the retentate appear red. This further demonstrates that the permeate is lighter than the retentate, with high concentrations of light saturate and light aromatic molecules in the permeate while there is rejection of heavier 3- and 4-ring aromatics. There is a cut-off near the normal paraffin with carbon number 17 which corresponds to a molecular weight of 240 Da. The normal paraffins continue beyond carbon number 30 since they are able to diffuse through the polymer matrix due to a small kinetic diameter in one dimension. FIGS. 16*b* and 16*c* are a representation of FIG. 16*a* in 3-dimensional form.

This experiment clearly demonstrates the utility of MOM membranes for the separation of complex hydrocarbon feeds such as crude oil, leading to enhancement of high-value molecules and rejection of low-value, heavier molecules while exhibiting permeances of industrial relevance.

While specific embodiments of the invention have been described herein for the purpose of reference and illustration, various modifications will be apparent to a person skilled in the art without departing from the scope of the invention as defined by the appended claims.

The invention claimed is:

1. An interfacial polymerisation process for the preparation of a thin film membrane, the process comprising the step of reacting a first monomer and a second monomer at the interface of two immiscible liquids to produce a crosslinked polymeric film;

wherein the crosslinked polymeric film is composed of at least one crosslinked polymer; and at least one of the first monomer and second monomer is a compound of formula (I) shown below:

$$T—Q—L—Y—L—Q—T \quad (I)$$

in which each Q is a chemically-inert oligomer having a predetermined number of repeating units, m;

Y is a reactive moiety comprising at least 2 groups capable of reacting with the other of the first monomer and second monomer to produce the crosslinked polymeric film;

each L is a linking moiety through which each Q is covalently bonded to Y; and each T is a chemically-inert terminating group.

2. The process of claim 1, wherein the crosslinked polymeric film is composed of at least one crosslinked polymer selected from the group consisting of polyamide, polyester and polyether.

3. The process of claim 1, wherein m is 2 to 20.

4. The process of claim 1, wherein Q is selected from the group consisting of:

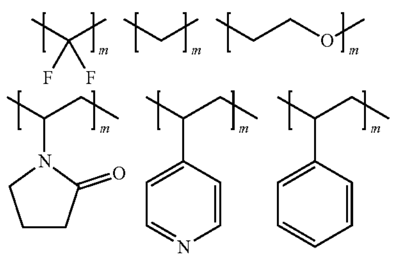

-continued

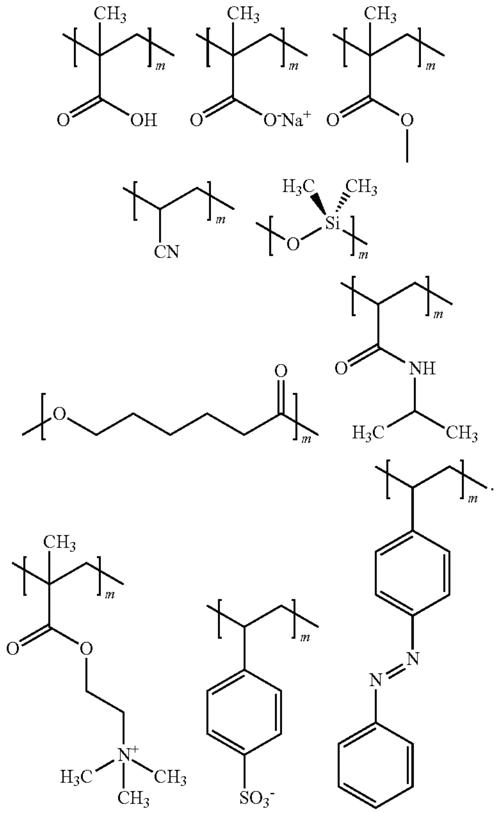

5. The process of claim 1, wherein Q is selected from the group consisting of:

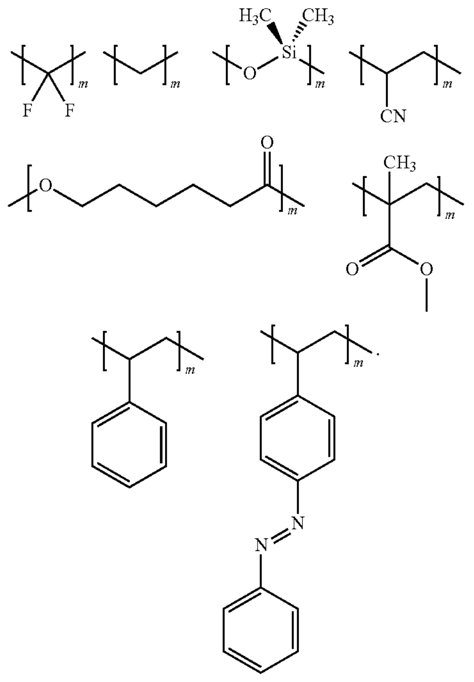

6. The process of claim 1, wherein Y comprises 3-10 reactive groups.

7. The process of claim 6, wherein the reactive groups present in Y are independently selected from the group consisting of $—NH_2$, —NH—, —OH and —C(═O) X, wherein X is halo.

8. The process of claim 1, wherein Y is oligomeric having n number of repeating units, and wherein each repeating unit n comprises one of the reactive groups, such that Y has the following structure:

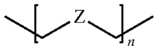

wherein each Z is independently selected from the group consisting of:

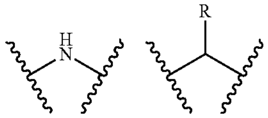

where R is selected from the group consisting of $—(CH_2)_vOH$, $—(CH_2)_vNH_2$, $—(CH_2)_vC(═O)X$ and $—(CH_2)_vC(═O)NHNH_2$, in which v is 0-4 and X is halo.

9. The process of claim 1, wherein the compound of formula (I) has a structure according to any of the following:

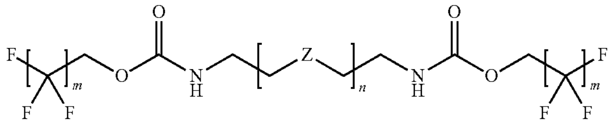

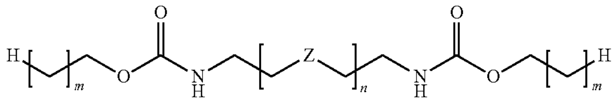

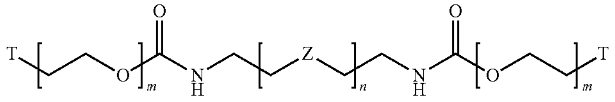

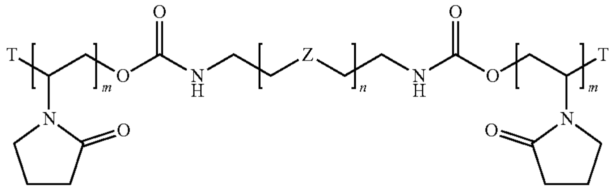

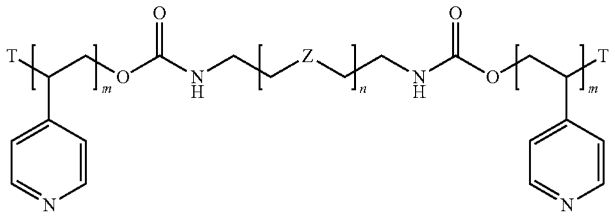

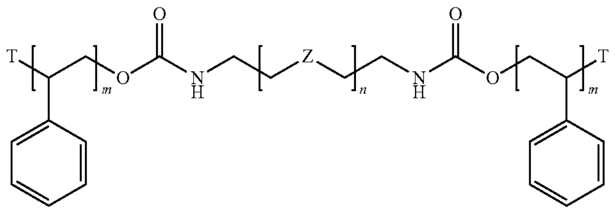

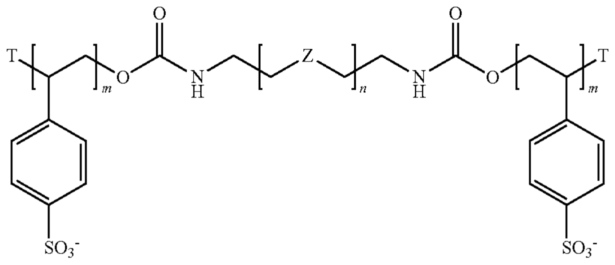

-continued
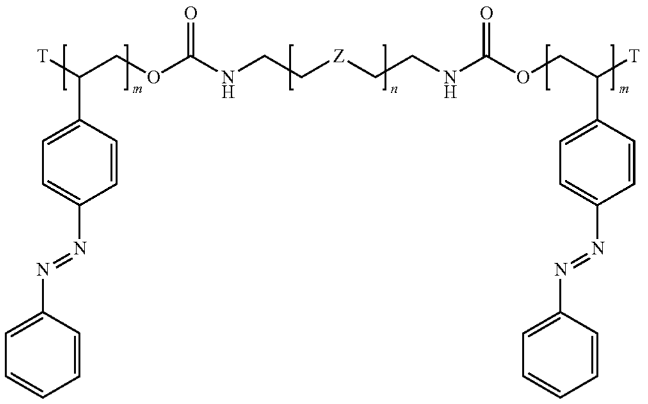
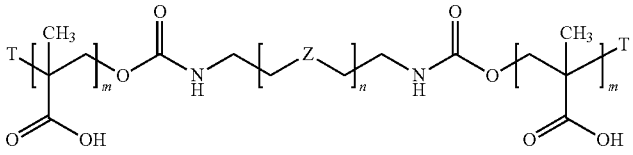
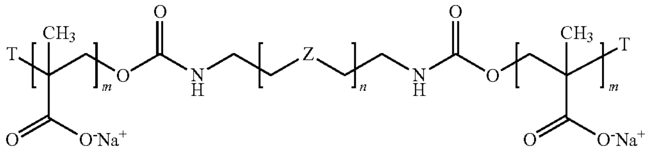
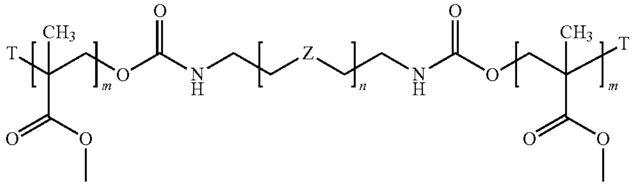
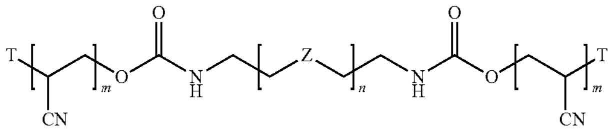
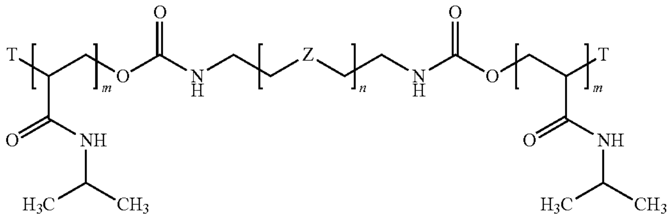
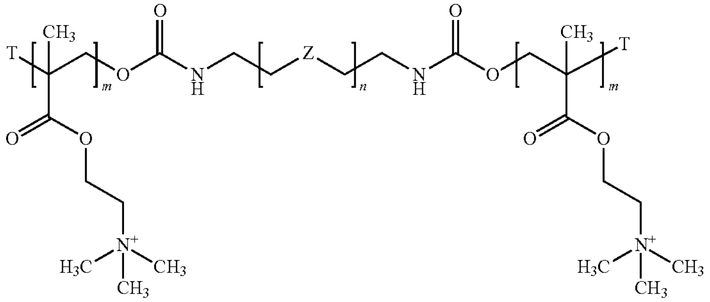
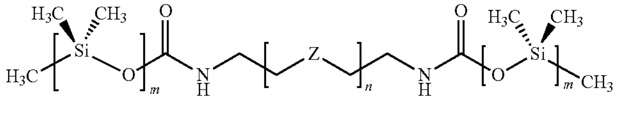

-continued

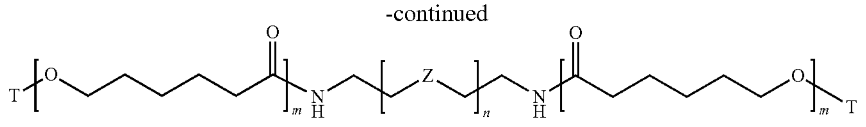

wherein T, m, Z and n are as defined in claim 1.

10. The process of claim 9, wherein Z is —NH—, —CH(OH)— or —CH(R)—, where R is a group —C(═O)Cl, m is 2-6, and n is 3-5.

11. The process of claim 1, wherein only the first monomer is a compound of formula (I) and the second monomer is a polyacylhalide, a polyamine or a polyhydroxy compound.

12. The process of claim 11, wherein (A) the first monomer is a compound of formula (I) in which Y comprises 3-6 reactive groups selected from the group consisting of $—NH_2$, —NH—, and —OH, and the second monomer is a polyacylhalide;

or (B) the first monomer is a compound of formula (I) in which Y comprises 3-6 reactive groups selected from the group consisting of $—NH_2$ and —NH—, and the second monomer is a polyacylhalide.

13. The process of claim 12, wherein the polyacylhalide is trimesoylchloride, isophthaloyl chloride or sebacoyl chloride.

14. The process of claim 1, wherein the step of reacting a first monomer and a second monomer at the interface of two immiscible liquids to produce a crosslinked polymeric film comprises the steps of:

(a) providing a first solution comprising:

(i) a first solvent, and (ii) the first monomer;

(b) contacting the first solution with a second solution, the second solution comprising:

(i) a second solvent, the second solvent being immiscible in the first solvent, and (ii) the second monomer;

wherein reaction of the first monomer with the second monomer in step (b) results in the formation of the crosslinked polymeric film at the interface of the first solvent and the second solvent.

15. The process of claim 14, wherein (A) the first solution comprises 0.005-30.0 wt. % of the first monomer;

and/or (B) the second solution comprises 0.005-30.0 wt. % of the second monomer.

16. The process of claim 14, wherein (A) the crosslinked polymeric film is formed on a supporting membrane during step (b);

or (B) the crosslinked polymeric film is formed at the free interface between the first solvent and second solvent during step (b) and is subsequently transferred onto a supporting membrane.

17. The process of claim 14, wherein the process further comprises the step (c) of isolating and drying the crosslinked polymeric film, optionally wherein the isolated and dried crosslinked polymeric film is contacted with a solvent selected from the group consisting of acetone, ethanol, methanol, isopropanol and water.

* * * * *